United States Patent
Emory et al.

(10) Patent No.: US 11,009,142 B2
(45) Date of Patent: May 18, 2021

(54) MOISTURE SENSING VALVES AND DEVICES

(71) Applicant: RAIN BIRD CORPORATION, Azusa, CA (US)

(72) Inventors: Mark W. Emory, Fullerton, CA (US); Francis Pyka, Azusa, CA (US); Michael F. Turk, Porter Ranch, CA (US); Samir Shah, Chino Hills, CA (US); James R. Parks, Santa Clara, CA (US); Richard T. Foster, San Dimas, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 16/857,792

(22) Filed: Apr. 24, 2020

(65) Prior Publication Data

US 2020/0326008 A1    Oct. 15, 2020

Related U.S. Application Data

(63) Continuation of application No. 15/773,938, filed as application No. PCT/US2016/061564 on Nov. 11, 2016, now abandoned.

(Continued)

(51) Int. Cl.
*F16K 31/00*    (2006.01)
*A01G 25/16*    (2006.01)
(Continued)

(52) U.S. Cl.
CPC .......... *F16K 31/001* (2013.01); *A01G 25/167* (2013.01); *A01G 27/003* (2013.01);
(Continued)

(58) Field of Classification Search
CPC .................. A01G 25/167; A01G 27/003; Y10T 137/189; F16K 31/001; F16K 7/17
See application file for complete search history.

(56) References Cited

U.S. PATENT DOCUMENTS 2,235,721 A * 3/1941 Morgan ............... F24D 19/0082
                                                              236/44 A
2,695,976 A * 11/1954 Hasenkamp ......... A01G 25/167
                                                              315/76
(Continued)

FOREIGN PATENT DOCUMENTS

CN    1796840 A  ‡  7/2006
CN    1796840 A  *  7/2006
(Continued)

OTHER PUBLICATIONS

"Particle Size Conversion" by Sigma-Aldrich, publicly available since at least Sep. 31, 2008 (Year: 2008).*

(Continued)

*Primary Examiner* — David Colon-Morales
(74) *Attorney, Agent, or Firm* — Fitch, Even, Tabin & Flannery LLP

(57) ABSTRACT

There are provided moisture sensing devices. These devices can be used to sense moisture in various mediums. They also can be used to control irrigation through use in valves and electronic switches and data feedback devices.

20 Claims, 28 Drawing Sheets

Related U.S. Application Data

(60) Provisional application No. 62/255,178, filed on Nov. 13, 2015.

(51) Int. Cl.
*A01G 27/00* (2006.01)
*F16K 31/08* (2006.01)
*F16K 7/17* (2006.01)

(52) U.S. Cl.
CPC .............. *F16K 7/17* (2013.01); *F16K 31/084* (2013.01); *Y10T 137/189* (2015.04)

(56) References Cited

U.S. PATENT DOCUMENTS

| | | | | |
|---|---|---|---|---|
| 2,863,698 A * | 12/1958 | Richards | ............ | A01G 25/167 239/64 |
| 2,931,376 A * | 4/1960 | Hendel | ................ | F16K 31/001 137/197 |
| 2,991,793 A * | 7/1961 | Whitlock | .............. | F16K 31/001 137/67 |
| 3,204,872 A * | 9/1965 | Whear | ................ | A01G 25/167 137/78.3 |
| 3,261,125 A * | 7/1966 | Arkebauer | .......... | A01G 27/04 47/81 |
| 3,273,849 A * | 9/1966 | Henning | .............. | A01G 25/167 251/4 |
| 3,426,539 A * | 2/1969 | Whear | ................ | A01G 25/167 405/37 |
| 3,512,712 A * | 5/1970 | Benesch | .............. | A01G 25/167 239/63 |
| 3,518,831 A * | 7/1970 | Miosek | ................ | A01G 25/06 405/37 |
| 3,562,731 A * | 2/1971 | Hsu | ...................... | D06F 39/081 340/604 |
| 3,797,740 A * | 3/1974 | Kah, Jr. | ................ | A01G 25/16 239/11 |
| 3,808,385 A * | 4/1974 | Klinefelter | ............ | H01H 35/42 200/61.04 |
| 3,874,590 A * | 4/1975 | Gibson | ................ | A01G 25/167 239/63 |
| 3,898,843 A * | 8/1975 | Waterston | ............ | A01G 25/023 405/37 |
| 4,095,458 A * | 6/1978 | Wild | ...................... | A01G 25/167 137/78.3 |
| 4,121,608 A * | 10/1978 | MacLeod | ............ | A01G 27/003 137/78.3 |
| 4,182,357 A * | 1/1980 | Ornstein | ................ | G05D 22/00 137/1 |
| 4,214,701 A * | 7/1980 | Beckmann | ............ | A01G 25/02 239/63 |
| 4,274,583 A * | 6/1981 | Hunter | ................ | A01G 25/167 137/78.3 |
| 4,648,555 A * | 3/1987 | Gumbmann, Jr. | ... | A01G 25/167 137/78.3 |
| 4,655,076 A * | 4/1987 | Weihe | .................... | G01N 19/10 73/73 |
| 4,657,183 A * | 4/1987 | Arkebauer | .......... | A01G 25/167 137/78.3 |
| 4,696,319 A * | 9/1987 | Gant | .................... | A01G 25/167 137/78.3 |
| 4,739,789 A * | 4/1988 | Hamilton | .............. | F16K 31/001 137/78.2 |
| 4,805,343 A * | 2/1989 | Patterson | .............. | A01G 27/04 47/48.5 |
| 4,843,758 A * | 7/1989 | Raczkowski | ........ | A01G 27/005 47/48.5 |
| 4,852,802 A * | 8/1989 | Iggulden | .............. | A01G 25/167 239/64 |
| 4,860,577 A * | 8/1989 | Patterson | .............. | G01N 13/04 73/64.47 |
| 4,938,248 A * | 7/1990 | Browne | .............. | A01G 25/167 137/78.3 |
| 4,970,823 A * | 11/1990 | Chen | ...................... | A01G 29/00 239/276 |
| 4,987,915 A * | 1/1991 | Goldsmith | ........... | A01G 25/167 137/78.3 |
| 4,989,628 A * | 2/1991 | Gil | ........................ | A01G 25/167 137/78.3 |
| 5,148,825 A * | 9/1992 | Gil | ........................ | A01G 25/167 137/529 |
| 5,273,066 A * | 12/1993 | Graham | .............. | F16K 31/001 137/78.3 |
| 5,329,081 A * | 7/1994 | Jones | ................... | A01G 25/167 200/61.04 |
| 5,670,435 A * | 9/1997 | Kajita | ................. | B01D 17/0202 502/80 |
| 5,794,848 A * | 8/1998 | Nunn | ................... | A01G 25/167 239/63 |
| 6,220,268 B1 * | 4/2001 | Bolton | ................ | A01G 25/167 137/14 |
| 6,570,109 B2 * | 5/2003 | Klinefelter | .......... | A01G 25/167 200/61.04 |
| 6,782,909 B1 * | 8/2004 | Ragless | .................. | G01N 13/04 137/78.3 |
| 6,977,351 B1 * | 12/2005 | Woytowitz | ............. | H01H 35/42 200/61.04 |
| 7,201,187 B2 * | 4/2007 | Irwin | ........................ | F16K 7/17 137/625.28 |
| 7,428,914 B2 * | 9/2008 | Kaneko | ................... | F16K 24/04 123/516 |
| 7,437,957 B2 * | 10/2008 | Jobin | ................... | A01G 25/167 73/73 |
| 7,506,658 B2 * | 3/2009 | Guest | ..................... | F16K 31/001 137/78.2 |
| 7,552,906 B2 * | 6/2009 | Irwin | ....................... | F16K 7/126 251/331 |
| 7,631,545 B2 * | 12/2009 | Skaling | ................... | G01N 7/10 137/78.3 |
| 7,690,391 B2 * | 4/2010 | Guest | ..................... | F16K 31/001 137/67 |
| 7,949,433 B2 * | 5/2011 | Hern | ....................... | G01K 13/00 700/284 |
| 8,001,989 B2 ‡ | 8/2011 | Guest | ..................... | F16K 31/001 137/67 |
| 8,336,575 B2 * | 12/2012 | Guion | .................... | G05D 16/10 137/495 |
| 8,371,325 B1 * | 2/2013 | Grizzle | .................. | F16K 31/12 137/78.3 |
| 8,397,745 B2 * | 3/2013 | Hurst | ...................... | G05D 7/03 137/119.03 |
| 8,726,932 B2 * | 5/2014 | Matsubara | ............ | F16K 15/026 137/515.5 |
| 8,979,430 B2 * | 3/2015 | Brown | .................. | A01G 25/167 405/37 |
| 8,979,431 B2 * | 3/2015 | Bayley | .................. | A01G 25/02 405/37 |
| 9,228,670 B2 * | 1/2016 | Grizzle | .................. | F16K 31/12 |
| 9,491,913 B2 * | 11/2016 | Mayer | .................. | A01G 25/167 |
| 2002/0124880 A1 * | 9/2002 | Tanikawa | ............ | A01G 27/003 137/78.3 |
| 2005/0087231 A1 * | 4/2005 | Sanders | ................ | F16K 31/001 137/489.5 |
| 2005/0178705 A1 * | 8/2005 | Broyles | ................ | B01D 35/153 210/109 |
| 2006/0144437 A1 * | 7/2006 | Dresselhaus | ......... | G01N 27/223 137/78.3 |
| 2007/0187634 A1 * | 8/2007 | Sneh | ....................... | F16K 31/003 251/30.01 |
| 2009/0126801 A1 * | 5/2009 | Grill | ....................... | F16K 37/0033 137/78.3 |
| 2013/0161411 A1 ‡ | 6/2013 | Grizzle | .................. | F16K 31/12 239/63 |

(56) References Cited

U.S. PATENT DOCUMENTS

| | | | | |
|---|---|---|---|---|
| 2015/0204454 A1* | 7/2015 | Hurst | ............... | F16K 31/124 137/1 |
| 2017/0332566 A1* | 11/2017 | Emory | ............... | F16K 31/001 |

FOREIGN PATENT DOCUMENTS

| | | | | | |
|---|---|---|---|---|---|
| CN | 102330821 | A | * | 1/2012 | |
| CN | 102330821 | A | ‡ | 1/2012 | |
| CN | 202165618 | U | * | 3/2012 | |
| CN | 202165618 | U | ‡ | 3/2012 | |
| CN | 102330821 | B | * | 7/2013 | |
| EP | 0441096 | A1 | * | 8/1991 | ........... A01G 25/167 |
| EP | 0441096 | A1 | ‡ | 8/1991 | |
| FR | 2735327 | A1 | * | 12/1996 | ........... A01G 25/167 |
| FR | 2735327 | A1 | ‡ | 12/1996 | |
| JP | 2012001380 | A1 | ‡ | 1/2012 | |
| RU | 2044470 | | ‡ | 9/1995 | |
| RU | 2044470 | C1 | * | 9/1995 | |
| RU | 2044470 | C1 | ‡ | 9/1995 | |
| SU | 1715186 | | ‡ | 2/1992 | |
| SU | 1715186 | A3 | ‡ | 2/1992 | |
| WO | 9102455 | A1 | ‡ | 3/1991 | |
| WO | WO-9102455 | A1 | * | 3/1991 | ........... A01G 25/167 |
| WO | 9801021 | | ‡ | 1/1998 | |
| WO | 9801021 | A1 | ‡ | 1/1998 | |
| WO | WO-9801021 | A1 | * | 1/1998 | ........... A01G 25/167 |
| WO | 9804915 | A1 | ‡ | 2/1998 | |
| WO | WO-9804915 | A1 | * | 2/1998 | ............ G01N 13/04 |
| WO | WO-2012001380 | A1 | * | 1/2012 | ........... A01G 27/003 |
| WO | 2016070005 | | ‡ | 5/2016 | |

OTHER PUBLICATIONS

"Arkema Group Pebax MH 1657 Polyether Block Amide" by "MatWeb", publicly available since at least Oct. 24, 2015 (Year: 2015).*
BAKKER, Gerben, et al., "New Polymer Tensiometers: Measuring Matric Pressures Down to the Wilting Point," Reproduced by Soil Science Society of America from Vadose Zone Journal, 2007, vol. 6, pp. 196-202. (Year: 2007).*
Bocking, K. A., et al., "Use of the Osmotic Tensiometer to Measure Negative Pore Water Pressure," Reprint by American Society for Testing and Materials from Geotechnical Testing Journal, Mar. 1979, vol. 2, No. 1, pp. 3-10. (Year: 1979).*
DURIGON, Angelica, et al., "Determination of soil hydraulic properties using polymer tensiometers in evaporation experiments," Brazilian Journal of Soil Science, Jul./Aug. 2011, vol. 35, No. 4, 10 pages. (Year: 2011).*
Infosheet v4 Polymer Tensiometer, "Specifications of the latest version of the Polymer Tensiometer (POT)," Jul. 1, 2011, [online]. Page 1 (Year: 2011).*
MONEY, Nicholas P., "Osmotic Pressure of Aqueous Polyethylene Glycols," Plant Physiology, Oct. 1989, vol. 91, No. 2, pp. 766-769. (Year: 1989).*
PCT International Search Report and Written Opinion of the International Searching Authority dated Apr. 20, 2017 for International Application PCT/US2016/061564, 10 pages, (Year: 2017).*
PCT International Search Report and Written Opinion of the International Searching Authority dated Feb. 18, 2016 for International Application No. PCT/US2015/058253, 11 pages, (Year: 2016).*

European Patent Office, Extended European Search Report for European Application No. 16/865,099.2 dated Jun. 4, 2019, 9 pages, (Year: 2019).*
USPTO; U.S. Appl. No. 15/523,093; Office Action dated Apr. 1, 2019; (pp. 1-28). (Year: 2019).*
USPTO; U.S. Appl. No. 15/523,093; Office Action dated Oct. 2, 2018; (pp. 1-20). (Year: 2018).*
USPTO; U.S. Appl. No. 15/773,938; Office Action dated Oct. 25, 2019; (pp. 1-28) (Year: 2019).*
Van Der Ploeg, Martine J., et al., "Matric Potential Measurements by Polymer Tensiometers in Cropped Lysimeters under Water-Stressed Conditions," Vadose Zone Journal, Aug. 2008, vol. 7, No. 3, pp. 1048-1054. (Year: 2008).*
Van Der Ploeg, Martine J., et al., "Polymer tensiometers with ceramic cones: direct observations of matric pressures in drying soils," Hydrology and Earth System Sciences, 2010, vol. 14, pp. 1787-1799. (Year: 2010).*
Bakker, Gerben, et al., "New Polymer Tensiometers: Measuring Matric Pressures Down to the Wilting Point," Reproduced by Soil Science Society of America from Vadose Zone Journal, 2007, vol. 6, pp. 196-202.
Bocking, K. A., et al., "Use of the Osmotic Tensiometer to Measure Negative Pore Water Pressure," Reprint by American Society for Testing and Materials from Geotechnical Testing Journal, Mar. 1979, vol. 2, No. 1, pp. 3-10.
Durigon, Angelica, et al., "Determination of soil hydraulic properties using polymer tensiometers in evaporation experiments," Brazilian Journal of Soil Science, Jul./Aug. 2011, vol. 35, No. 4, 10 pages.
European Patent Office, Extended European Search Report for European Application No. 16865099.2 dated Jun. 4, 2019, 9 pages.
Infosheet v4 Polymer Tensiometer, "Specifications of the latest version of the Polymer Tensiometer (POT)," Jul. 1, 2011, [online]. Retrieved from the Internet: <URL: http://www.wur.nl/en/Expertise-Services/Research-Institutes/Environmental-Research/Facilities-Products/Laboratories-Environmental-Sciences-Group/Soil-Physics-Laboratory/Determinations/Retention.htm>, 1 page.
Money, Nicholas P., "Osmotic Pressure of Aqueous Polyethylene Glycols," Plant Physiology, Oct. 1989, vol. 91, No. 2, pp. 766-769.
PCT International Search Report and Written Opinion of the International Searching Authority dated Apr. 20, 2017 for International Application PCT/US2016/061564, 10 pages.
PCT International Search Report and Written Opinion of the International Searching Authority dated Feb. 18, 2016 for International Application No. PCT/US2015/058253, 11 pages.
U.S. Appl. No. 15/523,093; Office Action dated Apr. 1, 2019; (pp. 1-28).
U.S. Appl. No. 15/523,093; Office Action dated Oct. 2, 2018; (pp. 1-20).
U.S. Appl. No. 15/773,938; Office Action dated Oct. 25, 2019; (pp. 1-28).
Van Der Ploeg, Martine J., et al., "Matric Potential Measurements by Polymer Tensiometers in Cropped Lysimeters under Water-Stressed Conditions," Vadose Zone Journal, Aug. 2008, vol. 7, No. 3, pp. 1048-1054.
Van Der Ploeg, Martine J., et al., "Polymer tensiometers with ceramic cones: direct observations of matric pressures in drying soils," Hydrology and Earth System Sciences, 2010, vol. 14, pp. 1787-1799.

\* cited by examiner
‡ imported from a related application

US 11,009,142 B2

MOISTURE SENSING VALVES AND DEVICES

CROSS-REFERENCE TO RELATED APPLICATIONS

This application is a continuation application of U.S. application Ser. No. 15/773,938, with a 35 U.S.C. 371 date of May 4, 2018, which is a U.S. national phase application of International Application Number PCT/US2016/061564, filed Nov. 11, 2016, designating the United States, which claims the benefit of U.S. Provisional Application No. 62/255,178, filed Nov. 13, 2015.

FIELD

The subject matter is directed to moisture sensing valves and devices and, more particularly, to a soil moisture sensing valve that uses swellable material to control the state of the valve.

BACKGROUND

Irrigation systems are used to provide controlled watering to vegetation zones and specific plants. These systems often employ controllers using timed schedules. Sensors also are used to provide data used to modify the irrigation schedules in conjunction with the controllers or to override the irrigation schedules independent of the controllers based on environmental conditions, such as weather data or moisture.

One common type of sensor is a moisture-based sensor. Moisture based sensors have been used in conjunction with controllers and valves to control irrigation based on soil moisture measurements. By way of example, the sensor for a valve is embedded in the ground and senses the moisture content of the soil about the valve. If the moisture content is sufficient, it will maintain the valve in a closed position shutting off flow of water for irrigation. On the other hand, if the moisture content is insufficient for the vegetation, it will open the valve and permit water to flow downstream to the irrigation emission devices.

There is a need for a valve using hydrophilic materials that reacts quickly to respond to moisture conditions. For example, there is a need for a valve using hydrophilic materials that expand or swell rapidly when in contact with moisture. The expansion of this material causes a valve element to move toward and eventually seat against a valve seat to shut off the water supply when there is sufficient moisture in the soil. When the water content of the soil dries, the material must contract and allow the valve element to move, such as under the bias of spring, away from the valve seat to open the valve to permit water to flow. There is a further need for this reaction to be variable to correspond to the moisture needs of the soil. In some cases, the valve may need to be fully open while in other cases it may only need to be partially open.

There is a need for swellable hydrophilic materials that react quickly and that do not stay in their maximum swollen state too long. Otherwise, the valves controlled by these materials may stay closed too long and may not permit the water to flow to the emission devices when needed. Thus, there remains a need for a moisture sensing valve that responds correspondingly to drying in the desired matric potential and is reliable, long lasting and cost-effective to manufacture.

DESCRIPTION OF PREFERRED EMBODIMENTS

The swellable material concept operates generally under the principle that a swellable material will expand when in wet or sufficiently moist soil and will prevent watering. Then, once the soil has dried to a point that irrigation would be needed soon, the expandable material will contract and would allow watering. As addressed below, a valve is buried in the soil, and moisture from the soil is drawn into a porous member until it reaches the swellable material. As the swellable material expands within the flexible chamber in response to moisture, a plunger or flexible diaphragm will move to close the valve. As the material contracts within the flexible chamber in response to the absence (or low level) of moisture, the plunger or diaphragm will move in the opposite direction to open the valve. Although some of the embodiments described herein are used to measure soil moisture conditions, other embodiments may be used to measure moisture conditions not involving soil, as addressed later in this disclosure. Embodiments may be used generally in any medium where one seeks to understand moisture characteristics and are not limited to the collection of moisture information in soil.

Figure 1:
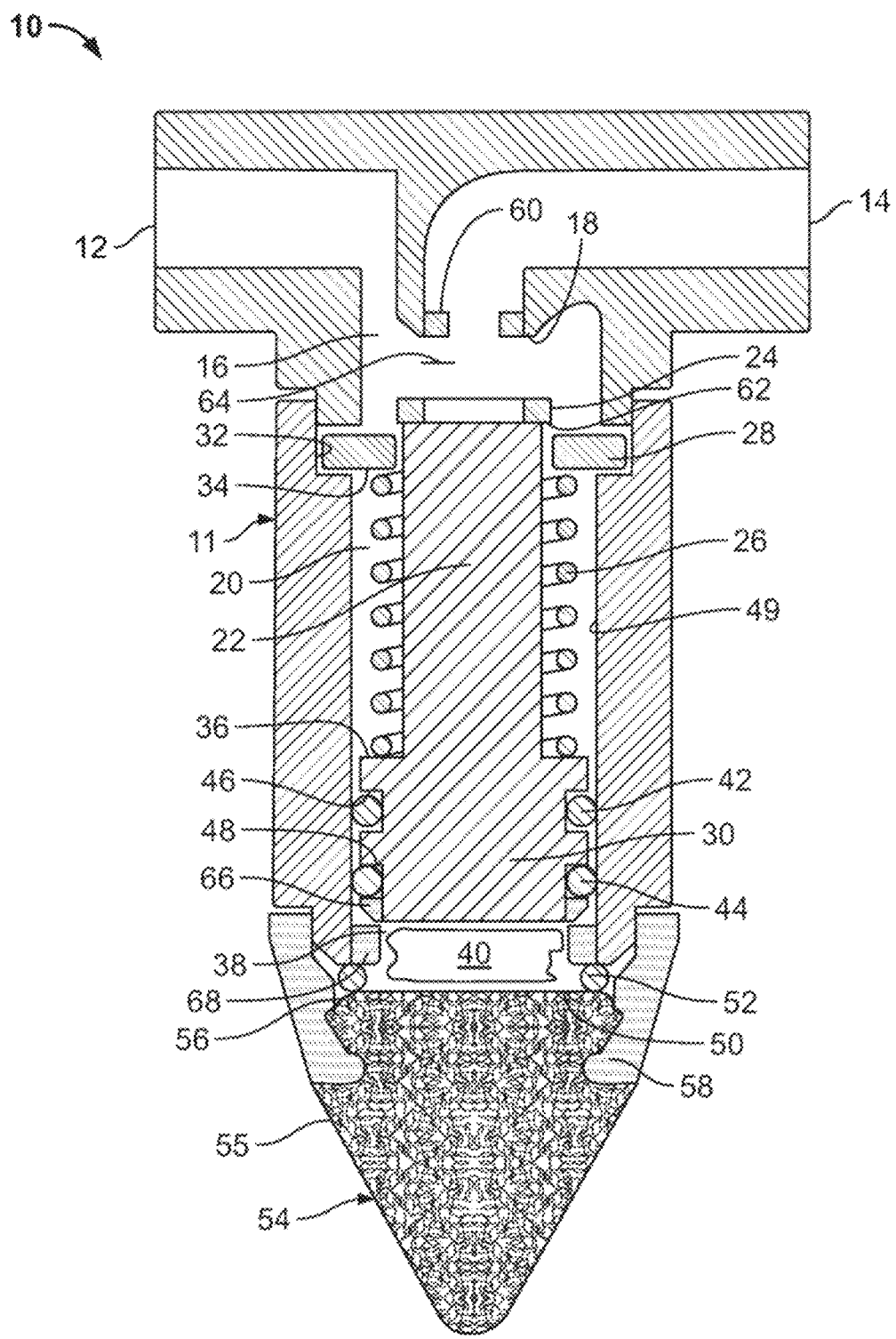
FIG. 1 is a cross-sectional view of a moisture sensing valve in an opened state.
Figure 2:
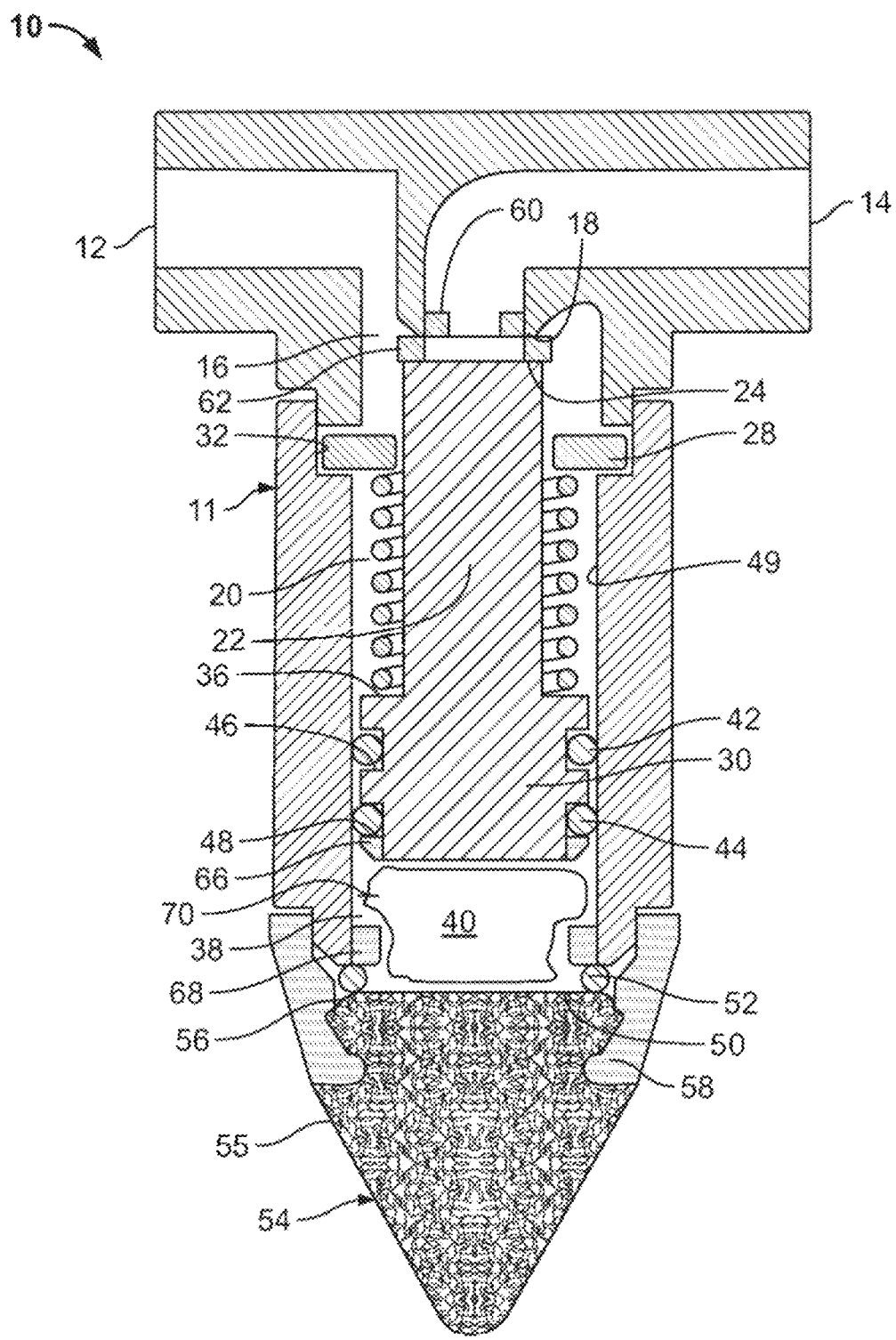
FIG. 2 is a cross-sectional view of the moisture sensing valve of FIG. 1 in a closed state.

With reference to FIGS. 1 and 2, there is illustrated a soil moisture sensing valve 10 triggered using swellable material. The valve 10 has an open state (FIG. 1) that permits water flow and a closed state (FIG. 2) that prohibits water flow. The valve 10 can be used as a standalone valve, as illustrated, to provide on-demand water flow to a watering zone or an irrigation device. A valve using swellable material also can be embedded into a watering device, such as a sprinkler or drip emitter (FIGS. 3-5), to provide on-demand irrigation at a specific location or plant, or used as a pilot valve for larger valves (FIGS. 6 and 7), such as those used to control irrigation zones. The on-demand nature helps provide the proper amount of water to the vegetation without under and/or overwatering. This is advantageous because it allows plants to be irrigated based on the actual soil moisture needs and conditions local to the plants, as opposed to being watered based on other methods that do not take into account local soil moisture content or rely on soil moisture measurements taken at locations remote from the plants being watered. As a result, on-demand watering based on swellable material, such as with the valves discussed below, addresses the effects of improper watering and needless water consumption.

Referring to FIGS. 1 and 2, the valve 10 includes a valve body 11 defining an inlet 12, an outlet 14, a passage 16 extending between the inlet 12 and the outlet 14, and a valve seat 18 located along the passage 16. While the valve 10 only has a single outlet, it could be modified to have multiple outlets to serve more than one irritation zone or emission device.

The valve body 11 defines an elongated chamber 20 extending below the valve seat 18. A valve piston or plunger 22 reciprocates in the elongated chamber 20. The valve plunger 22 includes an enlarged valve end 24 that engages the valve seat 18 to close the valve 10. The valve end 24 can include an elastomeric material that enhances sealing against the valve seat 18. An elastic member (spring 26) biases the plunger 22 away from the valve seat 18 to the open position for the valve 10. The spring 26 operates between a spring retainer 28 near the enlarged valve end 24 and an opposite enlarged lower end 30 of the plunger 22. The spring retainer 28 resides in a groove 32 and provides a first shoulder 34 that engages one end of the spring 26. The enlarged lower end 30 of the plunger 22 includes a second shoulder 36 facing the spring retainer 28, and the other end of the spring 26 engages this shoulder 36.

An expandable chamber 38 is located below the enlarged lower end 30 of the plunger 22 and contains a swellable material 40. The swellable material 40 expands in size (volume) when exposed to moisture and could be, for example, a hydrophilic polymer, preferably a thermoplastic elastomer. In one form, the swellable material 40 may be made of flexible polyether and rigid polyamide, such as a polyether block amide. The swellable material expands in response to moisture in order to close the valve and prevent watering and dries (shrinks from its swollen state) in response to an absence or low level of moisture in order to open the valve. In turn, the chamber 38 is collapsible/expandable so that it is variable in size (volume) in response to the changing state of the swellable material 40. The at rest size of the chamber 38 (i.e., when the chamber 38 is in an unexpanded state) may also be adjusted based on the nature of the soil in which the valve 10 is to be used, and this at rest size is independent of the operational engagement of the swellable material 40 with the plunger 22.

The characteristics of the swellable material and the chamber are selected and designed so that they cooperate to cause a valve to be opened or closed (or, as discussed further herein, to cause a triggering event in a device). In this regard, as should be evident, any of various types of swellable material may be used, as long as the material interacts with the chamber in the desired manner. For example, in one form, the chamber is operatively coupled to the swellable material so that the chamber expands or contracts in response to changes in the swollen state of the swellable material (expands or contracts in an amount determined by the degree of swelling). In another form, the chamber may have a fixed volume but may include a sensor that is operatively coupled to the swellable material and that results in a measurement corresponding to the change in swollen state (which, in turn, corresponds to moisture conditions, i.e., amount of surrounding moisture). In either case, for example, the size, position, and shape of the chamber can be designed and located to enhance the efficacy of the selected swellable material.

In one form, the swellable material 40 may be a polyether block amide, such as Pebax® MH 1657 manufactured by Arkema, which is very water absorbent. At 73° F. (23° C.), over a 24 hour period in water, it has been found to have a water absorption value of about 120% by mass, and the material increases in size (volume) through water absorption. The material 40 expands in the presence of moisture, expanding further as the presence of moisture increases, and contracting as moisture is removed from the material 40. Examples of other suitable swellable materials may include Pebax® MH 2030 manufactured by Arkema and Irgastat® P20 manufactured by BASF. It should be understood that other swellable materials may be suitable for use herein, and the examples provided are not intended to be limiting. For example, other swellable materials may include swellable clays (such as sodium bentonite and calcium bentonite), polyacrylamide, and cross-linked polyvinyl alcohol. It is desirable that the swellable material react to changes in the dryness of the soil (i.e., contract to open or more fully open the valve) as the soil matric potential decreases.

As one example, it has been found that the swellable material may be selected to start causing a valve to open within a range of about −90 to −100 kPa, and a valve may be caused to be fully open within a range of about −120 to −130 kPa. The exact soil matric potential value (or soil dryness) in which the swellable material responds depends on the nature of the soil (generally ranging from sandy to clay) because different types of soil allow the transmission of moisture therethrough at different values. In one form, the swellable material may be preferably selected so that a valve is fully open at about −120 to −130 kPA corresponding to about 50% plant available water capacity. Plant available water capacity (or available water content) is generally defined as the difference in water content between field capacity (the maximum water the soil can hold without draining) and the permanent wilting point (the moisture in the soil is too difficult for a plant to extract). For example, depending on the nature of the soil and the nature of the plants, the field capacity may be around −33 kPA, and the permanent wilting point may be around −1500 kPA. In this form, at about −120 to −130 kPA, 50% of the water content in the soil may be available to be taken up by plants in the soil. The range between field capacity and the permanent wilting point is a non-linear range in which it is generally much easier for plants to take up water near the field capacity value.

Further, in this form, it is contemplated that the swellable material preferably respond within the time between successive irrigation cycles. For example, the irrigation cycles may be arranged according to a planned irrigation schedule, such as once a week. In this example, it is contemplated that the swellable material would preferably respond sufficiently quickly (i.e., swell or contract) such that its response would allow or disallow the next weekly irrigation event (i.e., opening the valve for irrigation in response to swelling or closing the valve to block irrigation in response to contraction). As another example, the irrigation cycles may be more haphazard and not necessarily arranged according to a schedule. In this example, it is contemplated that the swellable material would preferably respond sufficiently quickly to allow or disallow upcoming irrigation events in order to maintain a general desired soil moisture over time and to limit plants in the soil from the effects of too much irrigation or too little irrigation.

The swellable material 40 may be obtained or manufactured into a particulate/powder/granular form and/or size. For example, Pebax® MR 1657 may be ground into a particulate/powder/granular form. The swellable material is deposited within the chamber 38. A particulate/powder/granular form may be desirable as it will not suffer from the same tension stress that would result in cracking of a molded/solid form of the material and as it may more easily conform to the changing volume of the chamber 38.

The enlarged lower end 30 of the plunger 22 closes one end of the chamber 38. Two o-rings 42, 44 are fitted into two grooves 46, 48 defined by the enlarged lower end 30 of the plunger 22 and seal against an inner surface 49 of the elongated chamber 20 to close the end of the chamber 38 at the plunger 22. A porous wall 50 defines the other side of the chamber 38 opposite the plunger 22. The wall 50 is the upper surface of the porous member 54 and defines the transition from the chamber 38 to the porous member 54 (addressed below). The swellable material 40 is preferably larger in particulate size than the openings in the porous tip 54, such that the porous member 54 retains the swellable material 40 within the chamber 38. In one particulate/powder/granular form, the particle size is preferably 500 microns or less (although it should be evident that other particle sizes may be preferable, depending on the nature of the swellable material used and size of the valve). If a particle size of about 50 microns was used, the porosity of the porous member 54 is preferably smaller by 50% or more in order to retain the material 40. As the particle size of the material 40 increases, the maximum porosity of the porous member 54 could also increase. A third o-ring 52 is situated between the porous member 54 and the valve body 11. The chamber 38 is preferably packed tight with the swellable material 38 to avoid settling effects that would reduce the expansion volume and to improve the effectiveness of the expanding material 40 when exposed to moisture.

The swellable material 40 may include additives to lengthen valve life. For example, some of the swellable material 40 may be microencapsulated at various thicknesses by one or more materials with desired breakdown rates. In this manner, as some of the swellable material 40 degrades, it will be replenished at a controlled rate by other swellable material 40 that has been microencapsulated. In other words, the swellable material 40 may be composed of a mixture of various coatings of time release capsule material. For example, the microencapsulation may be selected so that every two years some amount of the material 40 is replenished. In this manner, the effective life of the swellable material 40 and valve 10 may be lengthened.

The valve 10 includes a porous member 54 extending from the valve body 11 below the chamber 38. The porous member 54 includes small passages 55 that enable moisture to travel via capillary action to the chamber 38, while filtering out unwanted debris, and back to the soil. The porous member 54 preferably includes a surface 56 that defines the porous wall 50 of the chamber 38. A holding ring 58 secures the porous member 54 to the valve body 11 of the valve 10. This attachment may be done by any conventional technique, including, for example, a friction or snap fit, a weld or an adhesive.

When the soil local to the valve 10 is sufficiently wet, the moisture travels through the porous member 54. It travels through the porous wall 50 and is absorbed by the swellable material 40. In one form, the swellable material 40 is composed of particles or powder that absorb moisture and expand to occupy more volume. In this form, the particles are preferably tightly packed in chamber 38, such that the pressure inside the chamber 38 increases. The pressure inside the chamber 38 increases and overcomes the bias of the spring 26 and urges the plunger 22 toward the valve seat 18 when sufficient moisture is received by the material 40 to seat the valve end 24 on the valve seat 18 to close the flow of water through the valve 10 (FIG. 2). The spring 26 helps maintain the swellable material 40 in constant contact with the porous material, thereby improving the reliability of the valve 10. In one form, the spring 26 may be one or more helical springs, and/or the spring may have a preload pressure of about 100 pounds per square inch, although other types of springs and preloads may be used depending on the circumstances. The spring 26 helps squeeze out the moisture in order to cause the swellable material 40 to respond to drying in the desired matric potential range, and the preload of the spring 26 may be adjusted to achieve the desired matric potential range for different circumstances, such as different soil types and vegetation types.

As the soil local to the valve 10 dries, the moisture in the chamber 38 passes back to the soil through the porous member 54, and the pressure in the chamber 38 lowers. As the pressure lowers, the bias of the spring 26 moves the plunger 22 and, in turn, the valve end 24 away from the valve seat 18 to allow water to flow through the valve 10. The amount of movement of the valve end 24 away from the valve seat 18 will variably depend on the moisture content levels of the local soil.

Figure 21:
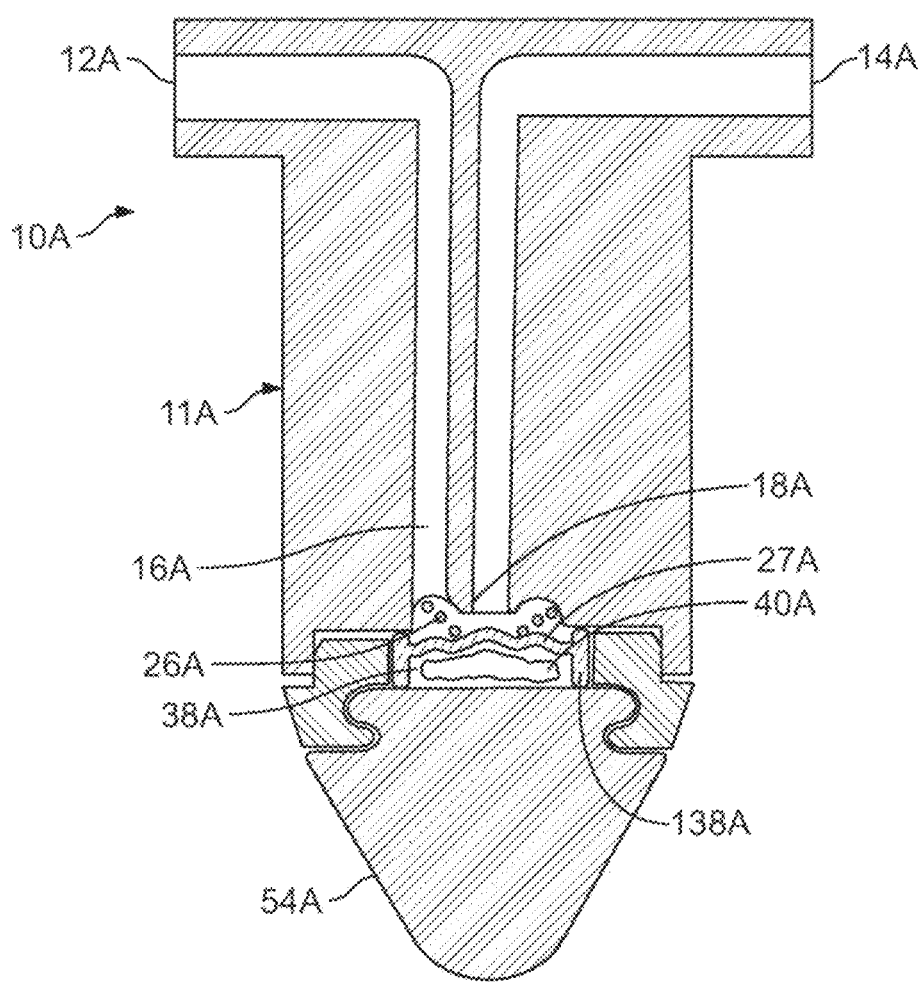
FIG. 21 is a cross-sectional view of an alternative embodiment of a moisture sensing valve in stake form in an opened state.

As should be evident, variations in the geometry and nature of the components of the valve 10 are possible. For example, as shown in FIG. 21, the valve 10 may be modified so that the passage 16 and valve seat 18 are disposed at or near the porous member 54. More specifically, the valve 10A (shown in an open state) includes a valve body 11A defining an inlet 12A, an outlet 14A, a passage 16A extending between the inlet 12A and the outlet 14A, and a valve seat 18A located along the passage 16A. In this form, the valve 10A includes both a spring 26A and a diaphragm 27A that are disposed near the porous member 54A (although valve 10A might also use a spring alone (see, e.g., FIG. 1) or a diaphragm alone at or near the porous member 54A). As with valve 10 (described above), when the soil local to the valve 10A is sufficiently wet, the moisture travels through the porous member 54A, and the swellable material 40A in the chamber 38A expands in the presence of moisture. The pressure inside the chamber 38A increases and overcomes the bias of the spring 26A and the diaphragm 27A and urges the diaphragm 27A against the valve seat 18A to close the flow of water through the valve 10A. As the pressure lowers, the diaphragm 26A moves away from the valve seat 18A to allow water to flow through the valve 10A. The diaphragm 26A includes a bead 138A about its circumferential perimeter to act as a wall of the chamber while also sealing the chamber 38A. The structure and operation of valve 10A are otherwise generally similar to that of valve 10.

Figure 3:
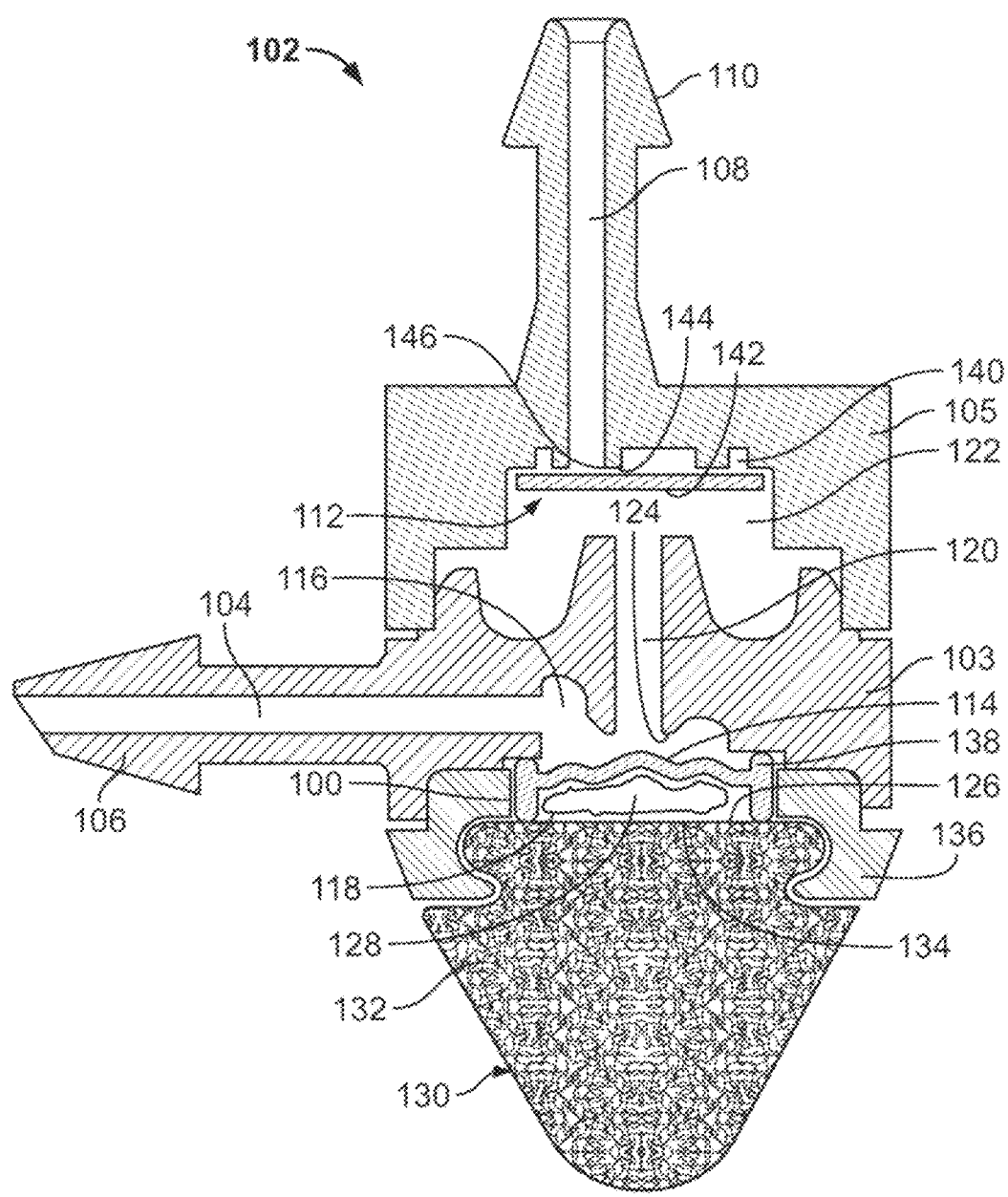
FIG. 3 is a cross-sectional view of an irrigation emission device having a moisture sensing valve in an opened state.
Figure 4:
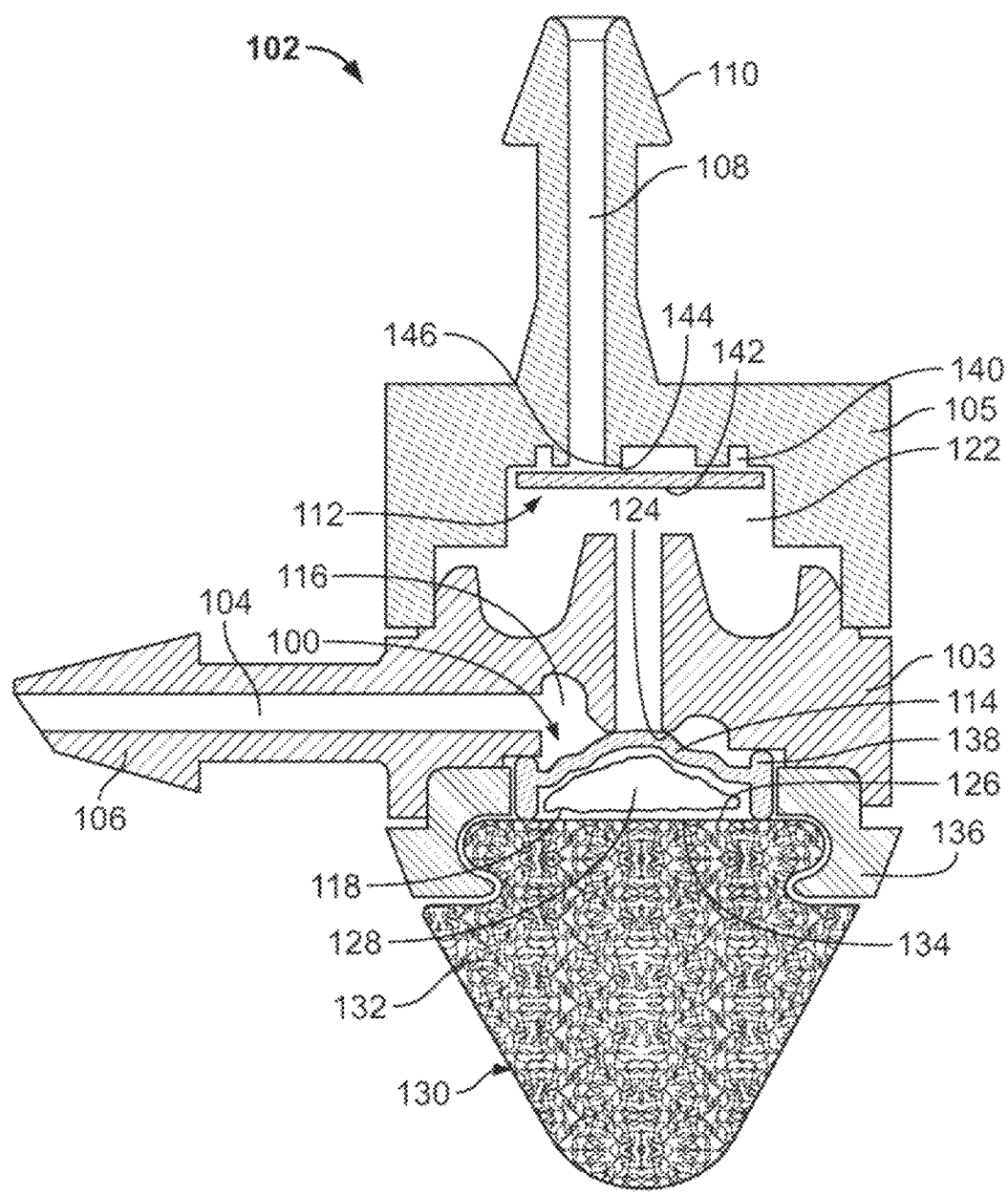
FIG. 4 is a cross-sectional view of the irrigation emission device of FIG. 3 with the moisture sensing valve in a closed state.

With reference to FIGS. 3 and 4, there is illustrated a soil moisture sensing valve 100 embedded into a drip type emitter 102. Valve 100 operates on the same swellable material principles described above for valve 10. While not illustrated, the valve 100 (or valve 10) could be embedded into any number of irrigation devices, including, for example, a pop-spray sprinkler, an impact sprinkler, and an emitter embedded in-line in drip irrigation tubing.

The drip emitter 102 includes an inlet and valve seat body 103 and a flow regulating body 105. The inlet and valve seat body 103 includes an inlet passage 104 with a first barb 106 for attaching a supply tube. The flow regulating body 105 includes an outlet passage 108 for delivering water directly from the emitter 102 or through a tube attached to a second barb 110. The valve 100 is intermediate the inlet and outlet passages 104, 108 in the inlet and valve seat body 103 for controlling the flow of water through the emitter 102 in an on-demand manner, and a flow regulator 112 is positioned downstream of the valve 100 in the flow regulating body 105 to regulate flow emitted from the drip emitter 102.

The valve 100 includes a diaphragm 114 mounted in the inlet and valve seat body 103 to separate an inlet chamber 116 from an expandable chamber 118. The inlet passage 104 leads into the inlet chamber 116. A transfer passage 120 extends from the inlet chamber 116 to a regulator chamber 122, which causes a pressure drop. The transfer passage 120 defines a valve seat 124 at the inlet chamber 116. The diaphragm 114 is configured to naturally bias away from the valve seat 124 but can be urged against this bias toward the valve seat 124 to control flow or eventually to engage the valve seat 124 to prevent water flow through the valve 100 and out from the emitter 102.

A porous wall 126 located opposite from, but facing, the diaphragm 114 defines a portion of the chamber 118. A swellable material 128, such as, for example, a hydrophilic polymer, preferably a thermoplastic elastomer, or any of the other swellable materials disclosed above. In one form, the swellable material 40 may be made of flexible polyether and rigid polyamide, such as a polyether block amide, or particles of such materials as explained above. The swellable material 128 is contained in the chamber 118 between the diaphragm 114 and the porous wall 126. The porous wall 126 allows bidirectional flow of moisture but retains the swellable material 128 within the chamber 118.

The valve 100 also includes a porous member 130 attached below the chamber 118. The porous member 130 includes small passages 132 that supply moisture via capillary action back and forth between the chamber 118 and the soil. The passages 132 filter out unwanted debris of the soil. The porous member 130 includes a surface 134 that defines the porous wall 126 of the chamber 118. A holding ring 136 secures the porous member 130 to the inlet and the valve seat body 103 of the emitter 102. This attachment may be done by any conventional technique, including, for example, a weld, a friction or snap fit or an adhesive. The diaphragm 114 includes a bead 138 about its circumferential perimeter that is sandwiched between the inlet and valve seat body 103 and the porous wall 126, which is supported by the porous member 130, to seal the chamber 118.

The flow regulator 112 of the emitter 102 is downstream of the valve 100 and is designed to reduce water emission to a specified rate, such as 0.5 gallons per hour (gph), 1.0 gph, 2.0 gph, etc. For example, a tortuous path 140 may be defined in the regulator chamber 122 to reduce the flow of water from the emitter 102. To regulate pressure, a diaphragm 142 may overlay the tortuous path 140 and constricts the tortuous path 140 as the pressure in the regulator chamber 122 rises to adjust the flow from the emitter 202 in a pressure compensating manner. The diaphragm 142 may also constrict a metering groove 144 adjacent an entrance 146 to the outlet passage 108 to provide further pressure compensation as pressure in the regulator chamber 122 rises or falls based on the supply pressure.

Figure 5:
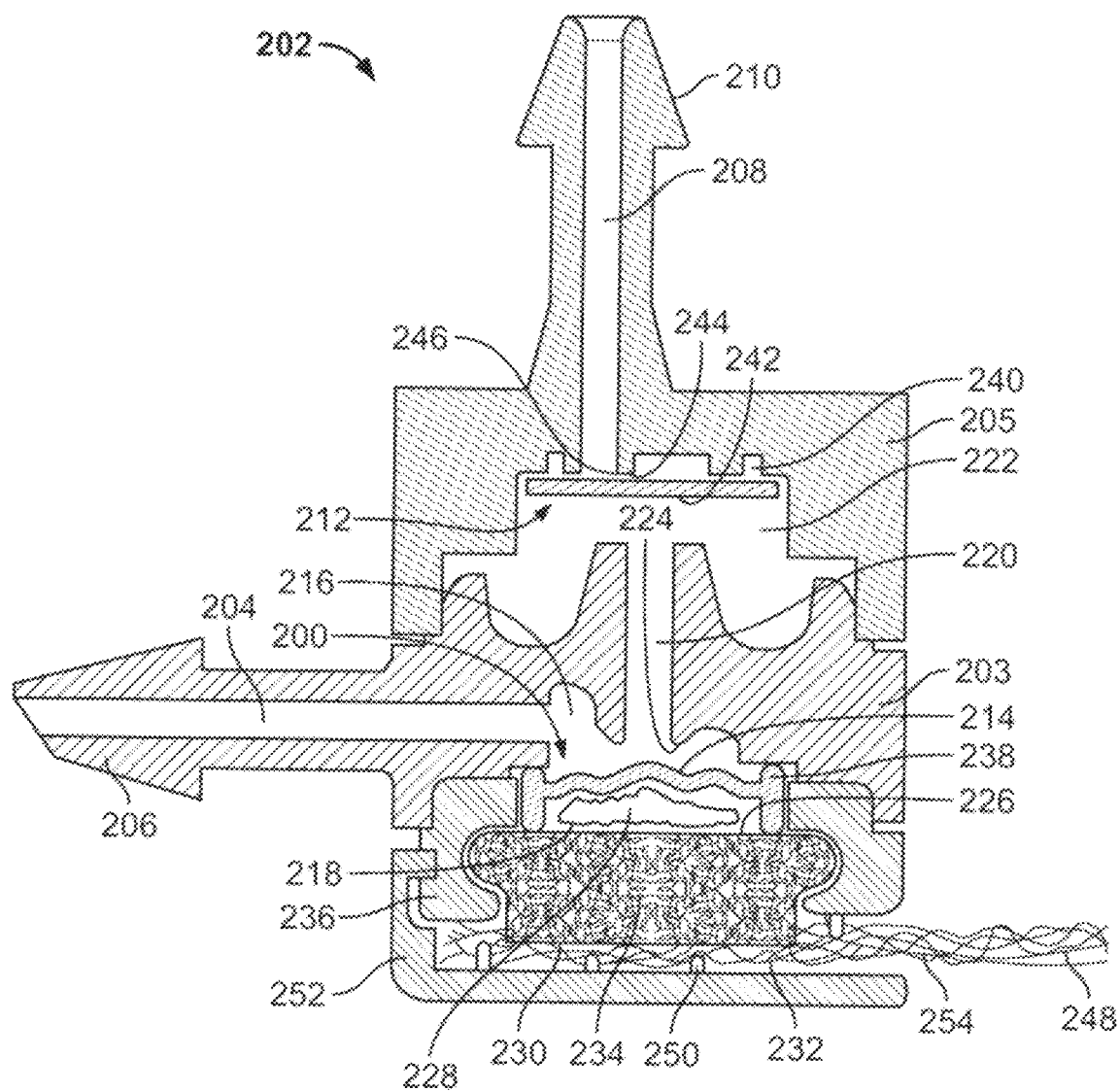
FIG. 5 is a cross-sectional view of another irrigation emission device with a moisture sensing valve in an opened state.

With reference to FIG. 5, there is illustrated another emitter with a valve 200 being embedded into an alternative drip emitter 202. Valve 200 operates on the same principles as described above for valve 10.

The drip emitter 202 includes an inlet and valve seat body 203 and a flow regulating body 205. The inlet and valve seat body 203 includes an inlet passage 204 with a first barb 206 for attaching a supply tube. The flow regulating body 205 includes an outlet passage 208 for delivering water directly from the emitter 202 or through a tube attached to a second barb 210. The valve 200 is intermediate the inlet and outlet passages 204, 208 in the inlet and valve seat body 203 for controlling the flow of water through the emitter 202 in an on-demand manner, and a flow regulator 212 is downstream of the valve 200 to regulate the flow emitted from the drip emitter 202.

The valve 200 includes a diaphragm 214 in the inlet and valve seat body 203 to separate an inlet chamber 216 from a chamber 218. The inlet passage 204 leads into the inlet chamber 216. A transfer passage 220 extends from the inlet chamber 216 to a regulator chamber 222, which causes a pressure drop. The transfer passage 220 defines a valve seat 224 at the inlet chamber 216. The diaphragm 214 is configured to naturally bias away from the valve seat 224 but can be urged against this bias toward the valve seat 224 to control flow or eventually to engage the valve seat 224 to prevent water flow through the valve 200 and out from the emitter 202.

A porous wall 226 located opposite from, but facing, the diaphragm 214 defines a portion of the chamber 218. A swellable material 228, such as, for example, a hydrophilic polymer, preferably a thermoplastic elastomer, or any of the other swellable materials disclosed above. In one form, the swellable material 40 may be made of flexible polyether and rigid polyamide, such as a polyether block amide, or particles of such materials as explained above. The swellable material 228 is contained in the chamber 218 between the diaphragm 214 and the porous wall 226. The porous wall 226 allows bidirectional flow of moisture but retains the swellable material 228 within the chamber 218.

The valve 200 also includes a porous body 230 attached below the chamber 218. The porous body 230 includes small passages 232 that supply moisture via capillary action back and forth between the chamber 218 and the soil. The passages 232 filter out unwanted debris of the soil. The porous body 230 includes a surface 234 that defines the porous wall 226 of the chamber 218. A holding ring 236 secures the porous member 230 to the inlet and valve seat body 203 of the emitter 202. This attachment may be done by any conventional technique, including, for example, a weld, a friction or snap fit or an adhesive. The diaphragm 214 includes a bead 238 about its circumferential perimeter that is sandwiched between the inlet and valve seat body 203 and the porous wall 226, which is supported by the porous member, to seal the chamber 218.

The flow regulator 212 of the emitter 202 is downstream of the valve 200 and is designed to reduce water emission to a specified rate, such as 0.5 gallons per hour (gph), 1.0 gph, 2.0 gph, etc. For example, a tortuous path 240 may be defined in the regulator chamber 222 to reduce the flow of water from the emitter 202. To regulate pressure, a diaphragm 242 may overlay the tortuous path 440 and constricts the tortuous path 240 as the pressure in the regulator chamber 222 rises to adjust the flow from the emitter 202 in a pressure compensating manner. The diaphragm 242 may also constrict a metering groove 244 adjacent an entrance 246 to the outlet passage 208 to provide further pressure compensation as pressure in the regulator chamber 222 rises or falls based on the supply pressure.

A flexible wicking or flexible capillary material 248 acts as a moisture path between the soil and the porous body 230. The wicking material may be of the type used in capillary mats for hydroponic farming. The wicking material 248 extends from the soil into direct contact with a surface 250 of the porous body 230. The wicking material 248 improves the coupling with the soil. A retainer body 252 attaches the wicking material to the emitter 202. The retainer body 252 includes a number of protrusions 254 that stake the wicking material 248 so that the wicking material 248 does not separate from the emitter 202. The retainer body 252 attaches to the holding ring 236 for the porous body 230. The retainer body 252 can be secured to the holding ring 236 by way of any conventional technique, including, for example, a weld, friction or snap fit or adhesive.

If the valve or emitter is buried in the soil so that the outlet is also buried, then copper metal can be used at the outlet to prevent roots from blocking flow from the outlet. Copper metal will inhibit root growth into the outlets. The copper member can be a ring inset into the outlet or around the outside of the outlet. The copper could also be co-molded to the inside or outside of the outlet or embedded in the body material near the outlet.

The soil matric potentials at which the standalone valves 10, 10A and the embedded valves 100, 200 begin to restrict water flow or allow water flow can be tuned to fit the watering environment, such as, for example, the different type of soils, which range from sandy to clay and many combinations in between. The size of the chamber, the amount of the swellable material in the chamber and/or the biasing force of the spring or the diaphragm, as the case may be, can be used to set and change the operating parameters of the valve. The valves can be preset from the factory for a certain set of conditions or can be made adjustable in the field. In the field, for example, the valve body can be adjustable to change the size of the chamber or the chamber can be accessible to add or remove amounts of swellable material. Alternatively (or additionally), the valve can be adjusted to change the preload of the spring or designed to be opened so that the spring or diaphragm can be interchangeable with ones with more or less biasing force as the situation may require.

If wetter soil or low matric potential (such as −20 kPa) is desired before restricting water flow, then a greater biasing force is needed for the spring or diaphragm before the valve closes. Conversely, if dryer soil or a higher matric potential (such as −40 kPa) is desired, then less biasing force is needed for the spring or diaphragm. Alternatively, for example, sandy type soil may require more biasing force to maintain the valve open because it tends to be drier soil, while clay type soil may require less biasing force to allow the valve to be closed more easily because it tends to be wetter soil.

In addition, the valves described herein can make use of a trigger point to open and close the valve. More specifically, the valves may be configured so that, when the spring 26 or diaphragm 26A/114/214 reaches a certain trigger position, the valve snaps either open or closed. In this arrangement, the valves would not open or close gradually but instead would alternate between either a fully open position or a fully closed position. For example, one or more magnets may be used to cause the valve to snap shut (fully closed) after the spring 26 or diaphragm 26A/114/214 has reached a certain trigger position where the magnet(s) attract the valve plunger 22 to valve seat 18 or the diaphragm 26A/114/214 to valve seat 18A/124/224. The opposite may be used as well where magnets snap open the valve based on a predetermined movement of the plunger or diaphragm.

For example, as shown in FIGS. 1 and 2, one or more magnets 60 may be placed at or near the valve seat 18. Similarly, the valve end 24 may include a magnetic portion 62, such that when the valve end 24 reaches a trigger (or threshold) position 64, the magnetic force is sufficient to attract the valve end 24 to the valve seat 18. Additionally, magnetic portions 66, 68 may be included both in the valve body 11 adjacent the chamber 38 and in the lower end 30 of the plunger 22. When the lower end 30 of the plunger 22 reaches a certain threshold position 70, these magnetic portions 66, 68 may attract the lower end 30 to the valve body 11. The magnets and magnetic portions are preferably selected so as not to interfere with the general expansion and contraction of chamber 38.

The valve seat for either the standalone valves 10, 10A or the emitter valves 100, 200 also could be provided with a small groove that would allow for a minimum bypass flow. Irrigation zones incorporating low pressure tubing and fittings along with a dynamic pressure regulator to maintain that low pressure would need this bypass flow in order to ensure there is enough flow for the dynamic pressure regulator to function. If no bypass was used and all soil moisture sensing devices were in the closed position, then the dynamic pressure regulator would no longer be able to regulate pressure to the zone, and the static pressure in that zone would reach full line pressure. If full unregulated line pressure was reached, then the tubing, fittings and/or connections could fail and cause leakage.

Any embodiment that will emit water directly from the device also can be designed or adapted to emit the water at an optimum distance. This distance can be selected based upon various use variables, such as soil type, plant type, placement of the device, burial depth of the device, or other known variables.

The valve 10/10A and emitter 102/202 described above may also include anti-oxidant, anti-microbial, and/or anti-fungal additives to resist breakdown of the swellable material. These additives may be incorporated in several different ways. First, these additives may be mixed in directly with the swellable material itself in the chamber 38/38A/118/218. One example of such an additive is the anti-oxidant BHT, which may be in powder form and may be mixed in with powdered swellable material. Second, additives may be added to the porous member 54/54A/130, porous body 230, or capillary 248 material, such as homogenously or in the form of a coating. Third, additives may be mixed in with other ingredients to form the valve/emitter housing or diaphragm 26A/114/214 material.

Further, the valve 10/10A and emitter 102/202 may also include additives to inhibit plant root intrusion into these devices. More specifically, the porous member 54/54A/130, porous body 230, or capillary 248 material may include an additive, such as copper, that inhibits root intrusion. For example, the porous member54/54A/130, porous body 230, or capillary 248 material may be metal injection molded with a copper blend, or copper or a copper blend may be applied as a coating to the porous member 54/54A/130, porous body 230, or capillary 248. This additive may inhibit roots attracted by moisture from growing into these portions of valve 10/10A and emitter 102/202.

In addition, the valve 10/10A and emitter 102/202 may include additives to compensate for variations in temperature and to promote more uniform operation at different temperatures. It is contemplated that the valve 10/10A and emitter 102/202 may be used within a temperature range of 32° F. to 120° F., and this variation in temperature affects operation. More specifically, it is believed that there is a general relationship between temperature and the expansion force exerted on the spring 26 or diaphragm 26A/114/214, depending on the nature of the swellable material used.

The swellable material may include additives to provide compensation for these temperature variations. For example, a powdered form of a temperature compensation material (such as a wax) may be mixed in with the swellable material. Alternatively, a solid form of the temperature compensation material may be introduced into the chamber 38/38A/118/218, along with the swellable material. However, the temperature compensation material should be used in a manner so as not to block the porous member 54/54A/130, porous body 230, or capillaries 248.

Figure 23:
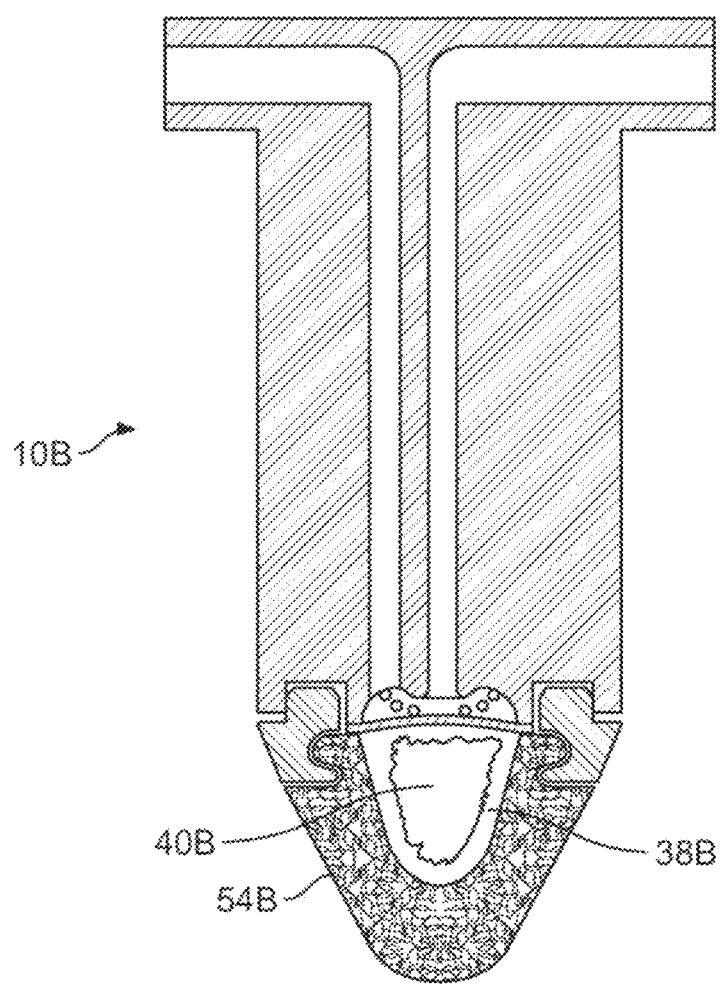
FIG. 23 is a cross-sectional view of an alternative embodiment of a moisture sensing valve in stake form in an opened state.

Moreover, the geometry of the chamber may be modified to seek to make response times faster. In one form, as shown in FIG. 23, the valve 10 (FIG. 1) may be modified so that a portion of the porous member 54 is hollowed out to form the chamber therein. More specifically, the valve 10B (shown in an open state) includes a chamber 38B formed in a recess in the porous member 54B and containing the swellable material 40B. The close proximity of the swellable material 40B to the soil shortens the leach path and may increase the responsiveness of the material 40B with respect to changes in the moisture of the soil. In other words, it is believed that the thickness of the porous member may have a large effect on how fast the material can respond. It is also believed that the responsiveness of the material may be increased by making the surface area of the porous member in contact with the swellable material as large as reasonably practicable and the thickness (height) of swellable material away from the porous member surface as small as reasonably practicable. As can be seen, in this example, the structure and operation of valve 10B are otherwise generally like that of valve 10.

In addition, the porous member 54/54A/130, porous body 230, and porous capillary material 248 may be made of various types of materials and processes. For example, the porous member 54/54A/130, porous body 230, and porous capillary material 248 may be composed of ceramic, porous sintered metal (powdered metal process), porous metal injection molding (MIM), porous plastic, a screen, or screen/fabric combinations, although other materials may also be used. The porous MIM material may use metal particles in conjunction with low melt plastics or wax. The screen/fabric combinations may help with the connection with the soil and may be used in capillaries 248 or in a capillary mat.

Figure 13:
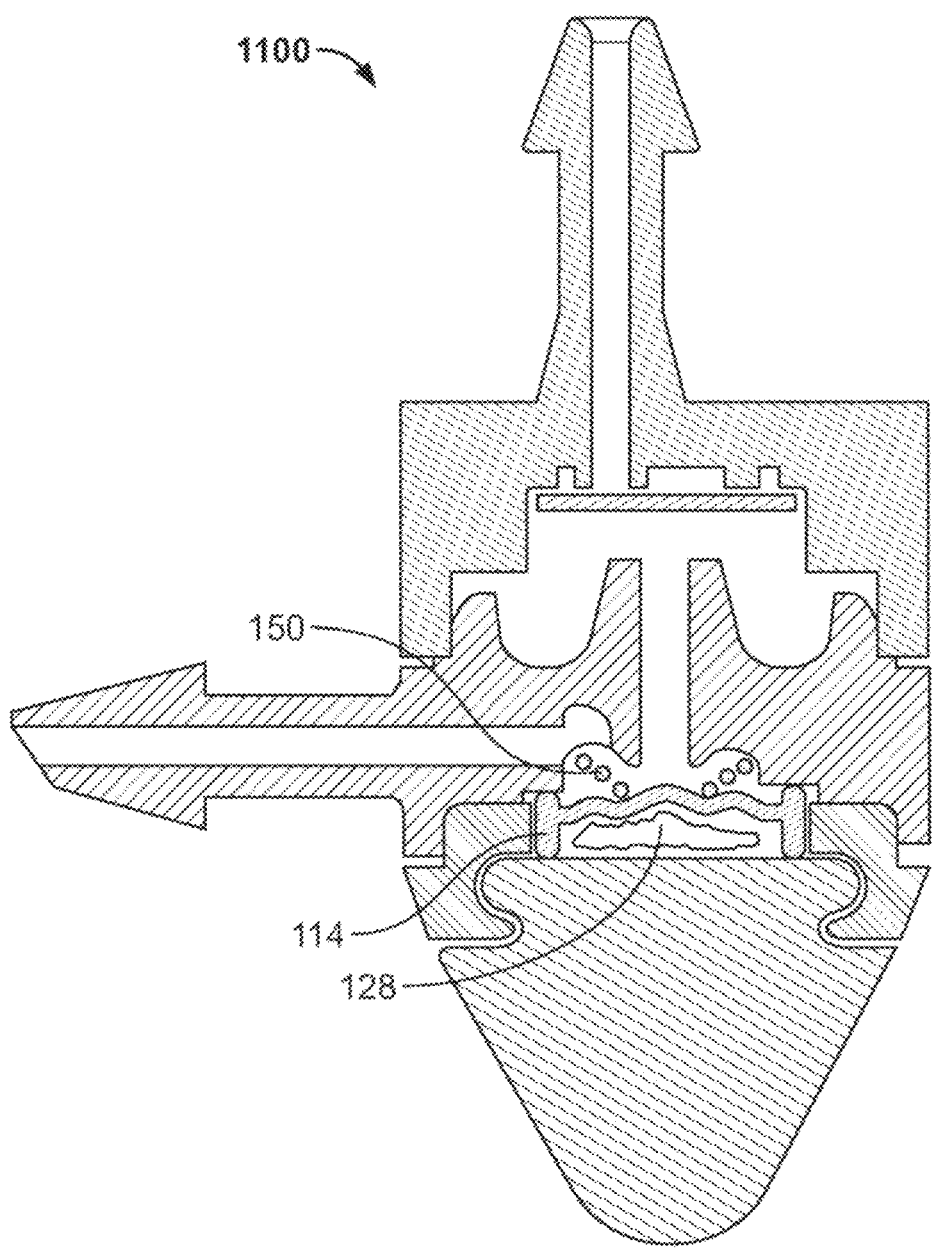
FIG. 13 is a cross-sectional view of an irrigation emission device having a moisture sensing valve with diaphragm and spring in an opened state.
Figure 14:
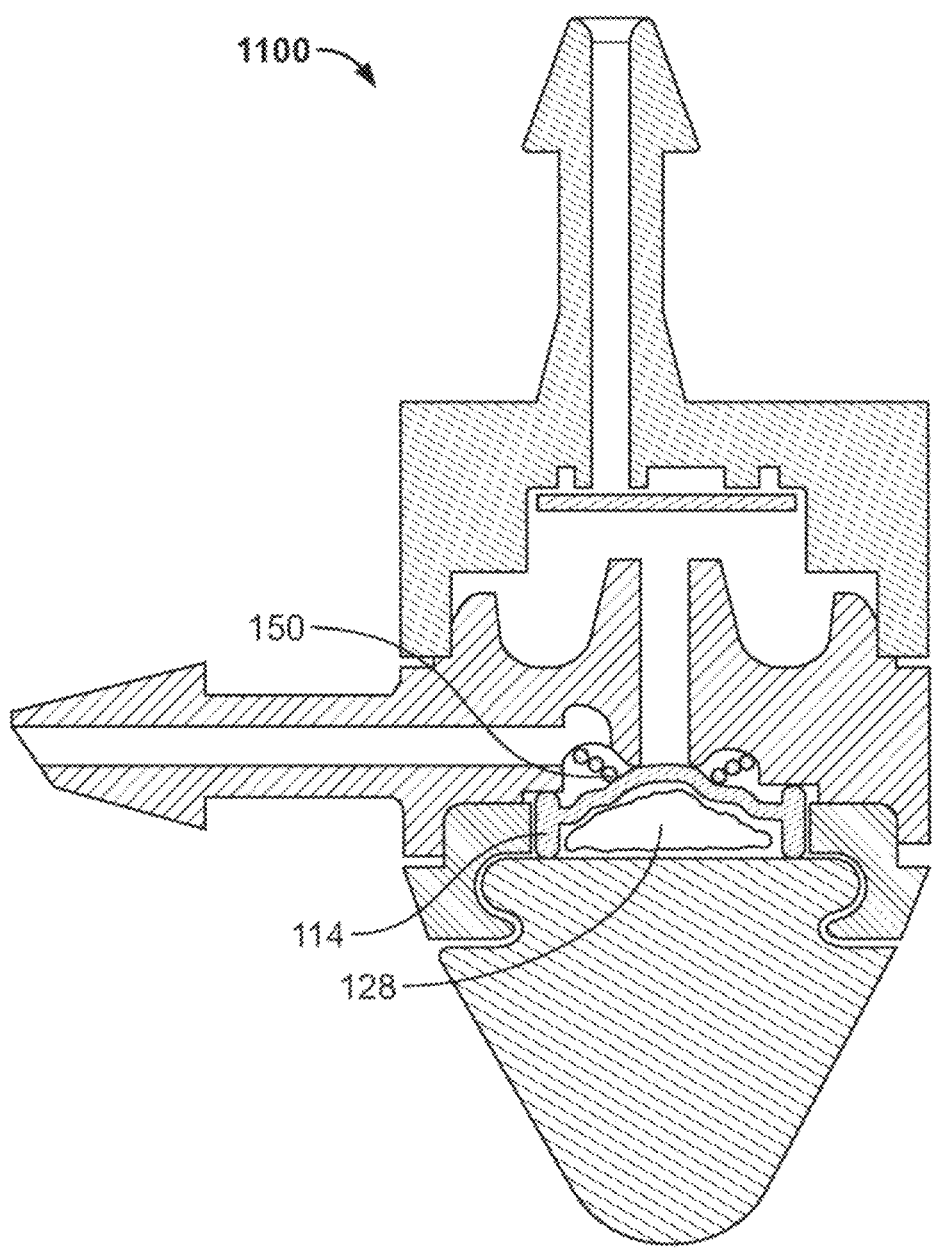
FIG. 14 is a cross-sectional view of the irrigation emission device of FIG. 13 with the moisture sensing valve with diaphragm and spring in a closed state.
Figure 15:
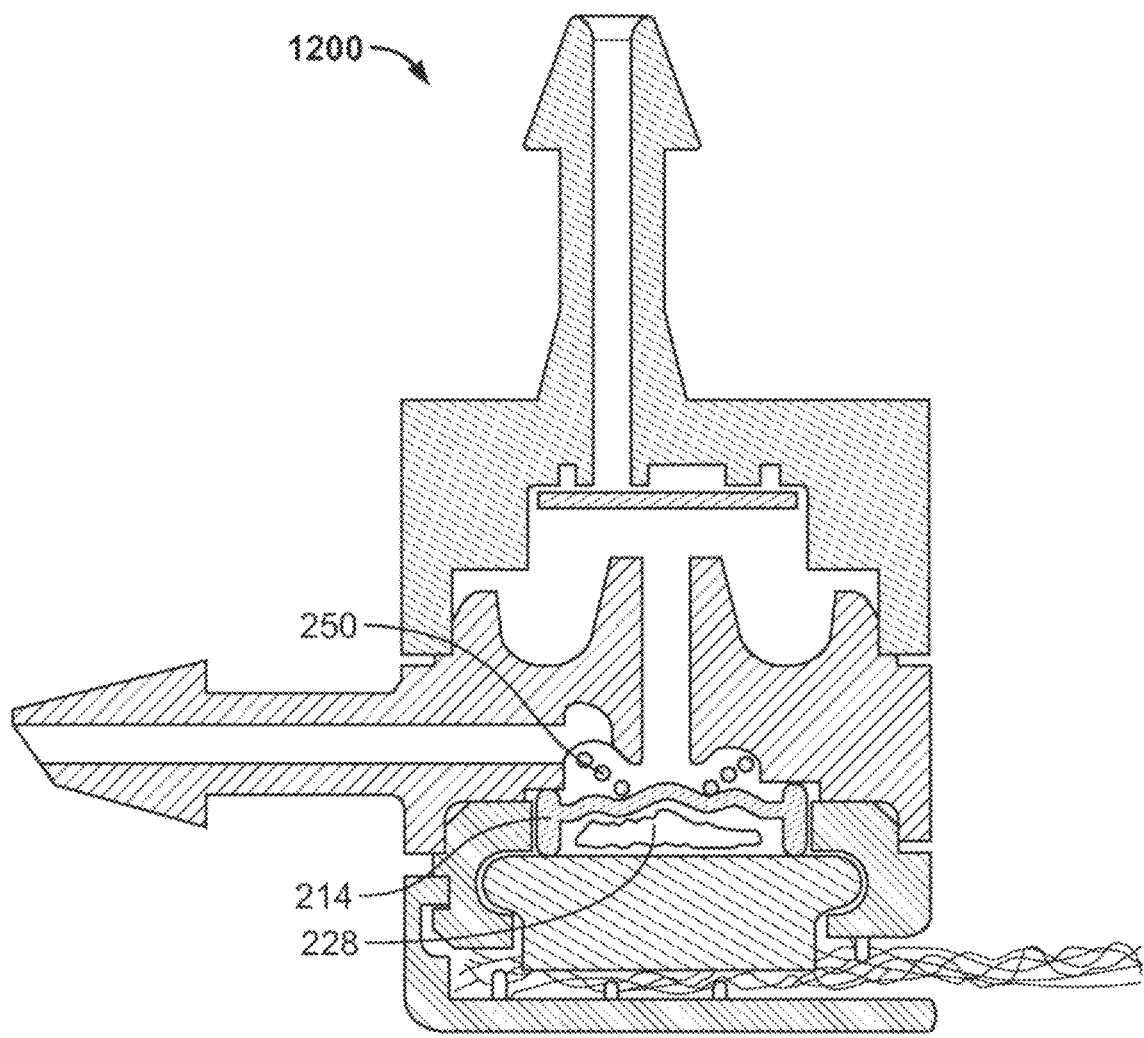
FIG. 15 is a cross-sectional view of another irrigation emission device with a moisture sensing valve with diaphragm and spring in an opened state.

FIGS. 13, 14, and 15 show alternative embodiments 1100, 1200 to the valves 100, 200 shown in FIGS. 3, 4, and 5. In these alternative embodiments 1100, 1200, a spring member 150, 250 has been added such that the alternative embodiments each include both a spring member 150, 250 and a diaphragm 114, 214, respectively. The spring member 150, 250 may be added to work in concert with the diaphragm 114, 214 so as to provide the sufficient and/or additional desired preload depending on the desired matric potential range. Also, as should be evident, a spring member 150, 250 may be used without any diaphragm 114, 214 at all (see, e.g., FIG. 1). The general discussion relating to the characteristics of and options for valves 100, 200 applies equally to valves 1100, 1200.

There are additional options and embodiments available that may be used in conjunction with the valves and emitters described above. For example, in the stake embodiments, depth markings could be added on the side of the stake in inch/mm increments. Alternatively (or in combination), pictures of plant types, e.g., grass, bush, or tree, could be added along the side of the stake. The measurements or images would help simplify installation. As another example, the stake embodiments could be made to be adaptable to accommodate a plant's growth over time, such as by making the stake relatively long (so a user can push the stake in further each year), making the length of the stake adjustable, or making the stake easily removable from the soil so that it can be placed periodically in a new position further from the plant.

Figure 6:
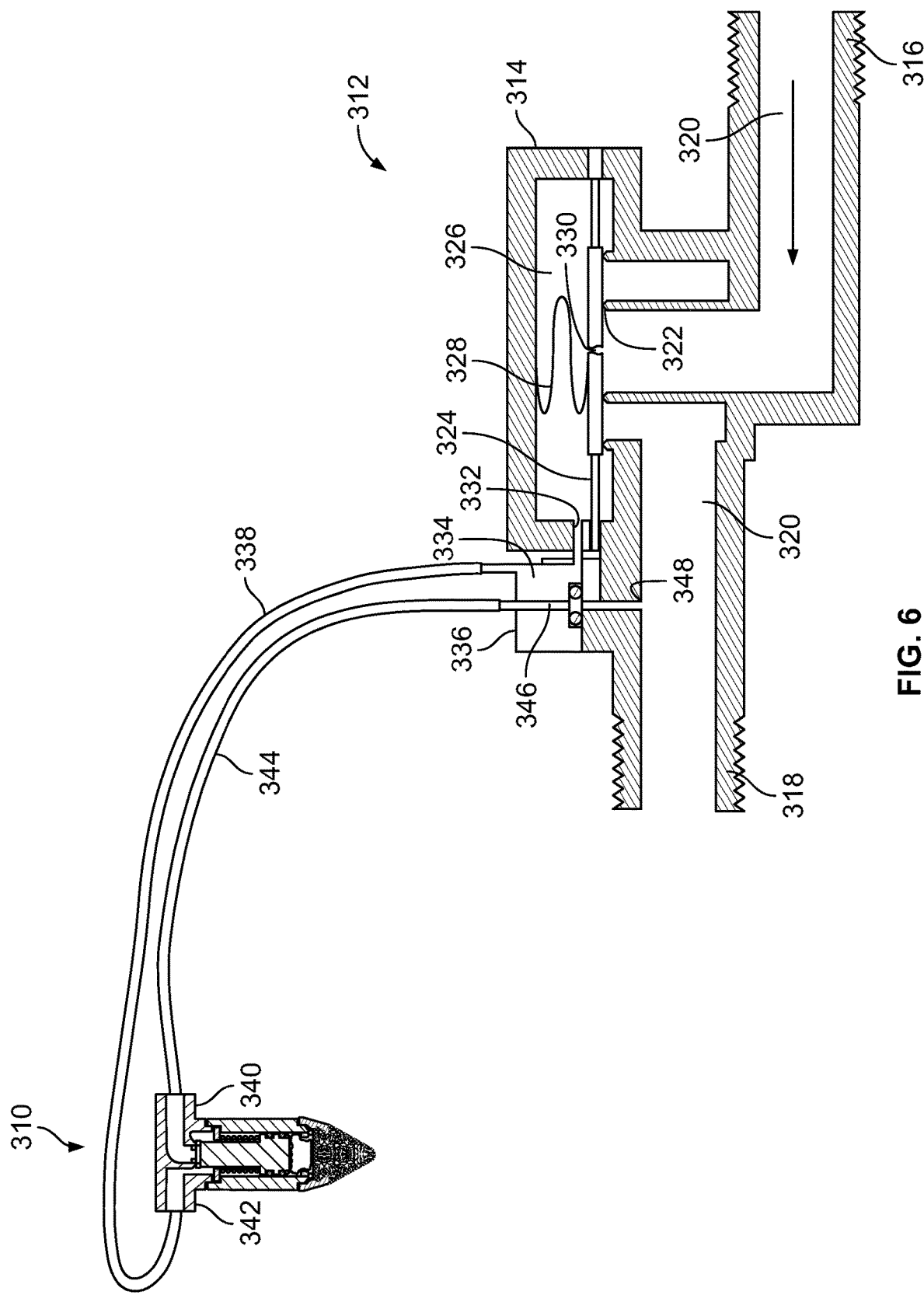
FIG. 6 is a cross-sectional view of a moisture sensing valve controlling a diaphragm valve in a closed state.
Figure 7:
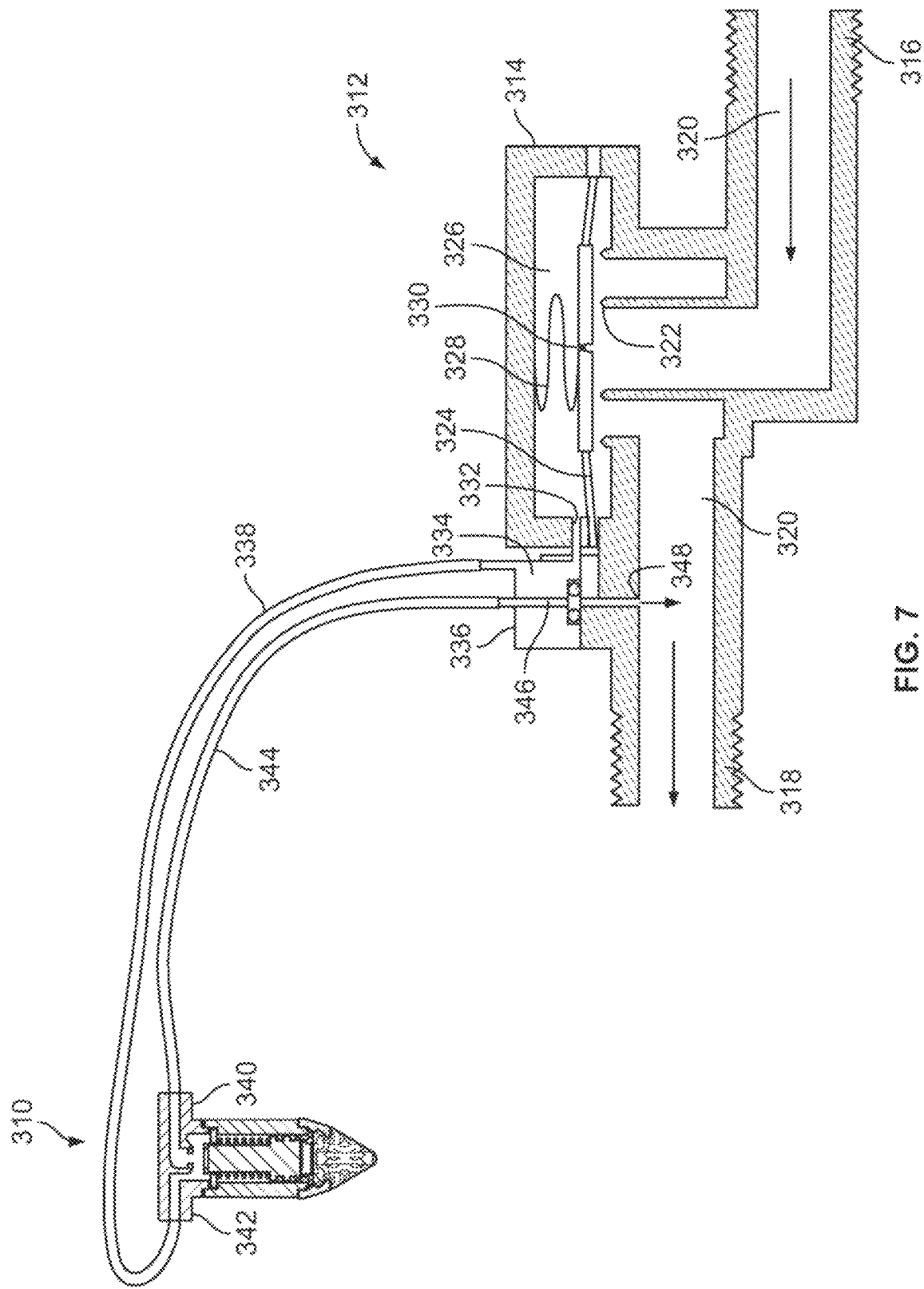
FIG. 7 is a cross-sectional view of the moisture sensing valve and the diaphragm valve of FIG. 6 in an opened state.

The valve 10, 10A described above mechanically controls flow from off to full on and variably between such limits. However, to directly control flow of relatively large amounts of water, such as that used in irrigation, the valve 10, 10A also would have to be relatively large. In order to scale down the size of the soil moisture sensing valve relative to the water flow requirements, valve 10, 10A (or valve 100, 200) could be employed as a pilot valve for controlling a larger valve. For example, as illustrated in FIGS. 6 and 7, a pilot valve 310 controls the operation of a larger main valve 312. The main valve 312 could be similar to diaphragm valves commonly used to control zones in irrigation systems. A solenoid actuated pilot valve is commonly used with these types of valves. The solenoid type pilot valve could be replaced with the swellable material soil moisture sensing pilot valve 310. The pilot valve 310 may be identical to the valve 10, 10A described above with reference to FIGS. 1 and 2, or it may adopt the forms of valve 100 (FIG. 3) or valve 200 (FIG. 5). It should be understood that the pilot valve is not to be limited to just this form and could take on other forms to meet requirements for controlling the main valve. When the pilot valve 310 is opened, the main valve 312 also opens to permit flow, and when the pilot valve 310 is closed, the main valve 312 closes to prohibit flow.

More specifically, the main valve 312 includes a valve body 314 defining a valve inlet 316 and a valve outlet 318. A flow passage 320 interconnects the valve inlet 316 to the valve outlet 318, and a valve seat 322 is located along the passage 320. A diaphragm 324 is situated over the valve seat 322 and operates to engage the valve seat 322 to shut off flow through the main valve 312 and to move away from the valve seat 322 to enable flow through the main valve 312. The valve body 314 and the diaphragm 324 define a pressure chamber 326 on the side of the diaphragm 324 opposite of the valve seat 322. A spring 328 is positioned in the pressure chamber 322 and biases the diaphragm 324 towards the valve seat 322.

The diaphragm 324 includes a small port 330 to allow a small amount of water from the valve inlet 316 to pass through the diaphragm 324 into the pressure chamber 326, even when the diaphragm 324 is engaged with the valve seat 322 in the closed position. The pressure chamber 326 includes a small outlet port 332 that allows water to flow from the pressure chamber 326 to the pilot valve 310. More specifically, the outlet port 332 leads into a first internal passage 334 through an adapter 336. The adapter 336 can be designed to thread into a threaded socket normally designed for a solenoid valve. The adapter 336 communicates with an outlet conduit 338 that provides water flow from the adapter 336 to an inlet 342 of the pilot valve 310. An outlet 340 of the pilot valve 310 communicates water flow from the pilot valve 310 back to the adapter 336 through a return conduit 344. A second internal passage 346 of the adapter 336 leads to a dump port 348 downstream of the valve seat 322 and the diaphragm 324.

In operation, the pilot valve 310 is located sufficiently remote from the main valve 312 and within the soil area being watered so that it is controlled by the amount of moisture content in such soil. The pilot valve 310 operates using swellable material as explained above for valve 10. When the pilot valve 310 closes (FIG. 6), water flow from the pressure chamber 326 is shut off, and the pressure in the pressure chamber 326, coupled with the bias of the spring 328, seats the diaphragm 324 on the valve seat 322 to shut off water flow through the main valve 312. Conversely, when the pilot valve 310 opens (FIG. 7), water flows from the pressure chamber 326 to the dump port 348, and the pressure in the pressure chamber 326 drops. The pressure eventually drops to a point where the pressure from the water from the valve inlet 316 overcomes the bias of the spring 328 and any remaining fluid pressure in the pressure chamber 326 and moves the diaphragm 324 away from being in engagement with the valve seat 322. This allows water to flow through the main valve 312 from the valve inlet 316 to the valve outlet 318.

The valve mechanisms described above mechanically operate to open and close the valve. The mechanisms also could be used to electronically trigger a valve to open or close. For example, the pressure created by the swellable material in the chamber could trigger a switch that authorizes an electrical control signal to be sent to a valve, such as a solenoid valve, to open or close the valve. Further, since the valve mechanism can be designed to move variably relative to soil moisture levels, such as .010 inch travel per 10kPa, a measuring device could be used to measure this movement. Alternatively, the size of the chamber could be monitored. This variable position or size measurement, which can be correlated with soil moisture levels, could be used to communicate the soil moisture levels to a compatible controller or valve. The controller or valve could then be programmed to use that information to calculate the amount of water needed during a future watering cycle, such as increasing or decreasing, the watering cycle time, or interrupting a watering schedule to stop, prevent or suspend watering.

As stated, the swellable material can be used to act as a microswitch in various electronic applications. For example, the swellable material can be used in a system to interrupt execution of one or more watering schedules of an irrigation controller based on its detection of moisture. The system may make use of a moisture threshold value, and in such a system, the fact that the switch is triggered indicates to the electronics that the threshold has been exceeded and the watering schedule should be interrupted.

Additionally, the swellable material may be used in electronic applications to provide continuously variable (or analog continuous) measurements or signals indicative of the amount of moisture in any medium in which it is desired to monitor moisture levels (and is not limited to soil moisture levels). For example, the swellable material may be used in systems in conjunction with strain gauges, capacitors, inductors, resistors, Hall effect devices, linear potentiometers, linear variable differential transformers, and other sensors that can measure changes corresponding to the degree of expansion of the swellable material. In this example, if the sensor is coupled to a spring reacting to the swellable material (such as in FIG. 1), the sensor can measure the amount of change in force, position, or electrical/magnetic characteristics corresponding to the degree of expansion of the swellable material. The sensed change in force, position, or electrical/magnetic characteristics may provide an analog continuous measurement corresponding to the amount of moisture in the medium. In one application, the value of the change in force, position, or electrical/magnetic characteristics may be transmitted to an interface for a determination of whether a moisture threshold has been exceeded or such a determination may be transmitted to the interface.

Figure 22:
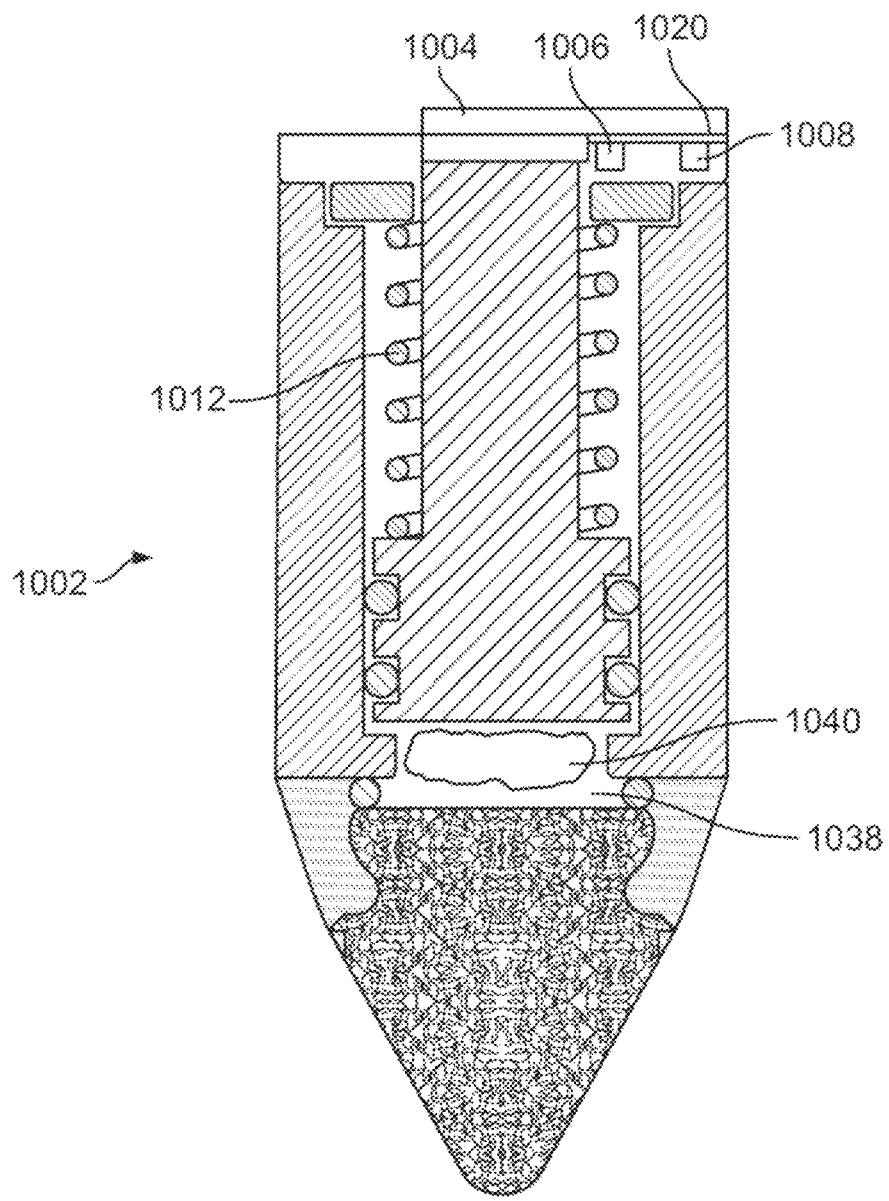
FIG. 22 is a cross-sectional view of an electronic device for operating in response to medium moisture content.

FIG. 22 is a modified version of FIG. 1 and shows an example of a sensor unit 1002 using the swellable material 1040 coupled to a sensor 1004. The sensor unit 1002 generates a signal indicative of the amount of moisture in the medium. The sensor unit 1002 may include a power source (battery and/or solar cell) 1006, a wireless transmitter 1008, and other circuitry and output components. A signal representing a sensed value that corresponds to an amount of moisture may be transmitted to an interface unit. In some forms, the interface unit may be configured to interpret the information in the signal and correlate that information to a corresponding level of moisture. In other embodiments, the signal may be converted to a corresponding level of moisture prior to being transmitted to the interface unit. Still further in some implementations, the sensor unit 1002 determines whether a threshold level of moisture is present and transmits an indication of whether the threshold is exceeded in response to an inquiry from the interface unit.

As can be seen in FIG. 22, the swellable material is again used to urge the spring 1012 upwardly when the chamber 1038 expands. In this form, the sensor unit 1002 includes a strain gauge 1004 (sensor) coupled to a printed circuit board 1020 and that engages the spring 1012 when the chamber 1038 expands. Expansion of the chamber 1038 changes the force applied to the strain gauge 1004 by the spring 1012. The spring 1012 may initially contact the strain gauge 1004 or not. This change in force on the strain gauge 1004 is detected by appropriate electronics on the printed circuit board 1020 comprising the sensor electronics. In some embodiments, the printed circuit board 1020 may comprise a controller, memory, transceiver and/or other relevant elements. The sensed force provides an analog continuous measurement corresponding to the amount of moisture in the medium (and may be converted to a digital signal by an analog-to-digital converter). The value of this sensed force may be transmitted to an interface unit for a determination of whether a moisture threshold has been exceeded and/or a determination of whether a threshold is exceeded may be transmitted to the interface unit.

As should be evident, other types of sensors 1004, besides a strain gauge, may be used. In another form, a metal piece may be mounted at or near the expandable surface of the chamber 1038 or one end of the spring 1012 and a capacitor may be mounted on the printed circuit board 1020. A change in the spacing between the metal piece and the capacitor will change the capacitance in a measurable amount corresponding to the amount of moisture. In yet another form, the sensor 1004 uses an inductor wrapped around the chamber 1038 or spring 1012 and coupled to the printed circuit board 1020. Expansion of the chamber 1038 changes the inductance in an amount that may be detected by appropriate electronics on the printed circuit board 1020, providing an analog continuous measurement corresponding to the amount of moisture and/or an indication of exceeding a threshold. In yet another form, the sensor 1004 may use a graphite stack resistor coupled to the printed circuit board 1020 and that engages the spring 1012 when the chamber 1038 expands. Expansion of the chamber 1038 changes the force applied to the graphite stack resistor by the spring 1012, changes its electrical resistance, and is detected by appropriate electronics on the printed circuit board 1020, providing an analog continuous measurement corresponding to the amount of moisture. In yet another form, the sensor 1004 uses a magnet on a surface of the chamber 1038 and a Hall effect device mounted on the printed circuit board 1020. Expansion of the chamber 1038 causes the spacing between the magnet and the Hall effect device to change, changing the output of the Hall effect device. This change in the output of the Hall effect device is detected by appropriate electronics on the printed circuit board 1020. In yet another form, the sensor 1004 uses a linear potentiometer, which may include a wiper of a fixed resistive sensing element. Expansion of the chamber 1038 changes the position of the linear wiper on the potentiometer, changing its resistance. This change in resistance is detected by appropriate electronics on the printed circuit board 1020. In each of these forms, the sensor 1004 may provide an analog continuous measurement corresponding to the amount of moisture and may signal whether a moisture threshold has been exceeded. As should be evident, these electronic embodiments may be used to provide moisture level data for understanding the actual moisture level value in a number of different applications, including, for example, soil laboratory testing, soil surveying (construction, geology, forestry etc.), agriculture irrigation management, potted plant monitoring, golf course irrigation management, control zone management, park and municipality irrigation management, and other large to medium size commercial irrigation management.

Further, as should be evident, additional options and modifications are available for these electronic embodiments. For example, they may include an actual visual display of the output. As another example, they may be provided with a wireless connection to provide data to a user directly via smart phone, provide data to a control system, or provide data to other internet or local based systems that could use the moisture level information in order to perform an action, send an alert or make a decision appropriate for the medium in which moisture levels are being measured. For example, where soil moisture levels are being monitored, the information could be used to irrigate, not irrigate, and/or adjust/suggest the irrigation time or amount of water needed.

In another form, the device would not have a swellable chamber that moves a diaphragm or piston, but instead would make use of a fixed volume chamber that does not expand significantly. As the swellable material expands in the chamber, the pressure inside the fixed volume chamber would increase and would be measured by a pressure sensor (transducer). That pressure level would correlate to a moisture level and could be read by various electronic means. This approach might be useful for laboratory, agriculture and other industrial, commercial and residential applications.

Figure 24:
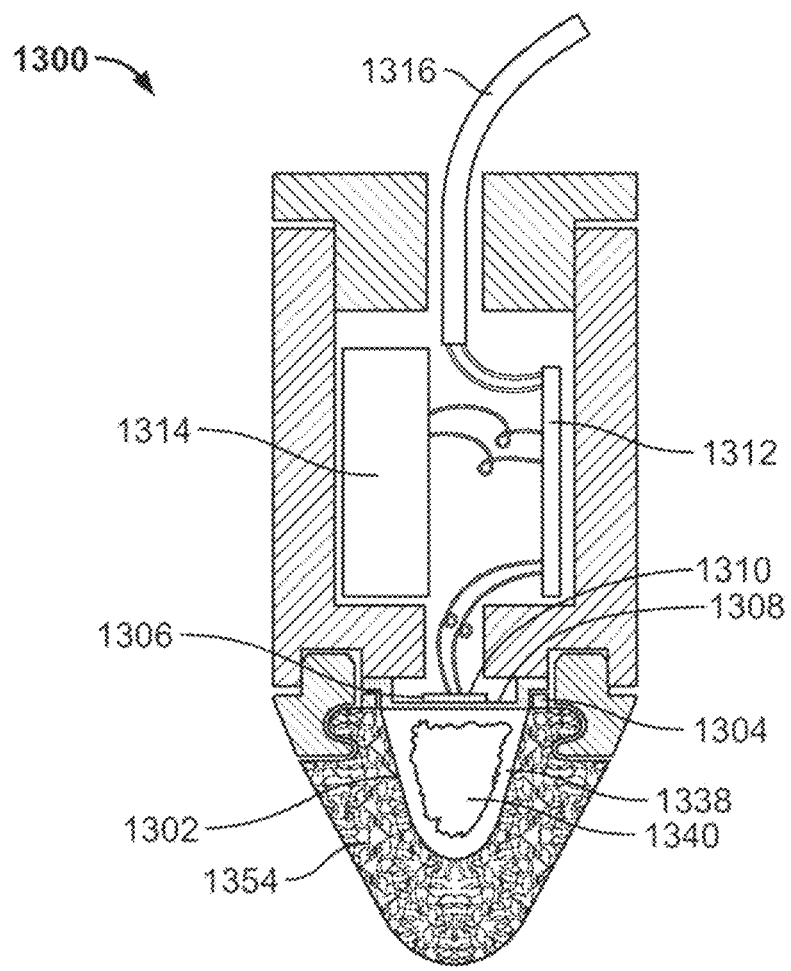
FIG. 24 is a cross-sectional view of an alternative embodiment of an electronic device for operating in response to medium moisture content.

One example of a device 1300 with a fixed volume chamber is shown in FIG. 24. As can be seen, in this form, a portion of the porous member 1354 has been hollowed out to form the chamber 1338 therein (like FIG. 23). The swellable material 1340 is contained within the chamber 1338. As the material 1340 expands due to moisture, it exerts a force upon (i.e., presses against) the boundary of the fixed volume chamber 1338, and this force increases as the amount of moisture increases. In this form in FIG. 24, the chamber 1338 is bounded by walls 1302, seal 1304, and a sensor (pressure transducer 1306). In one form, the pressure transducer 1306 includes a metal diaphragm 1308 in contact with (or coupled to) a strain gauge 1310. The diaphragm 1308 is deformed very slightly (or stressed) by pressure from the swellable material 1340, and the degree of deformation can be precisely measured by the strain gauge 1310. These measurements correspond to moisture amounts.

The pressure transducer 1306 is electrically coupled to a printed circuit board assembly 1312, which is in turn electrically coupled to a power source 1314 (such as a battery, capacitor, etc.) The printed circuit board assembly 1312 is further electrically coupled to a communication interface 1316. The communication interface 1316 may be a data/power line that is connected to a controller (such as an irrigation controller), data acquisition system, data recorder, or other system. Alternatively, the communication interface 1316 may be an antenna for wireless communication to a controller, data acquisition system, data recorder, or other system. In this form, for example, the printed circuit board assembly 1312 may transmit a command to a controller based on the amount of moisture (such as to open or close valve(s)) or it may transmit force measurements to a data acquisition or other system corresponding to the amount of moisture. As should be evident, there are numerous variations to this device, and this specific form is not intended to be limiting. As non-limiting examples, the following parameters may be readily modified: the size, position, and shape of the chamber, the nature and type of sensor (sensors other than pressure transducers may be used), the type of power source, the programmed operation and capability of the printed circuit board assembly, and the nature of the communication interface.

These electronic embodiments all may be used also to monitor and provide moisture level data in applications outside of the field of irrigation. For example, these devices could be generally used for leak detection, such as for leaks involving valve boxes, appliances, and machinery. As another example, embodiments could be used for moisture level detection and/or management, such as in the following areas: around building foundations (especially to manage moisture of expanding clay around and under foundations to prevent damage to the foundation/home), for landfill moisture monitoring and control, to understand leaching rates, in grains in a silo or other grain shipping/storage containers, in bins/pallets for food moisture monitoring, in wastewater applications to see if the soil is too wet to release the wastewater (prevent/control runoff), as a disposable device embedded into concrete to measure/control cure times, in mining applications, and as part of a forest fire dryness detector system. In addition, embodiments could be adapted to control fluid levels in pools or in industrial fluid level applications. Further, embodiments could be used in applications to shut off flow in a specific amount of time when moisture is present based on the swell rate of the material and the mass of material.

Figure 8:
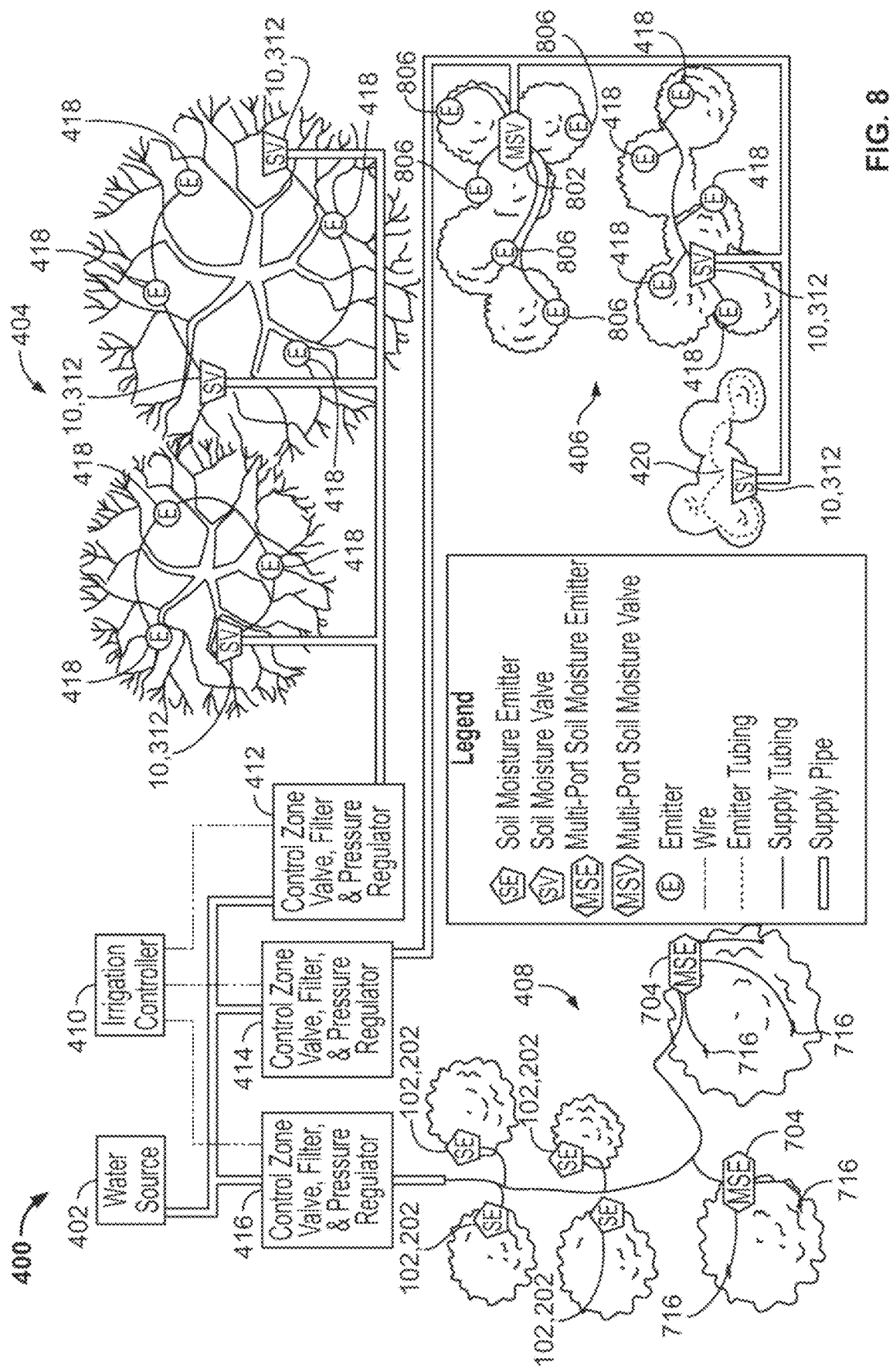
FIG. 8 is layout schematic of an irrigation system using moisture sensing valves and emission devices with moisture sensing valves embedded therein.

FIG. 8 illustrates an exemplary irrigation system 400 that includes a water source 402 supplying three irrigation zones 404, 406, 408. An irrigation controller 410 controls three control valves 412, 414, 416, one for each of the three zones 404, 406, 408, respectively. The first zone 404 includes three soil moisture valves, such as valve 10 or main control valve 312 controlled by pilot valve 310, with each controlling a subzone with emitters 418 connected through tubing to the proper location for watering. The second zone 406 includes two subzones each controlled by a soil moisture valve, such as valve 10 or main control valve 312 controlled by pilot valve 310. One of the subzones include emitter tubing 420, and a second subzone includes a number of emitters 418 connected through tubing to the proper location for watering. A third subzone includes a single multi-outlet valve unit 802, as described below with reference to FIG. 12. Emitters 806 are connected to the valve with conduit to position the emitters 806 at the proper location for watering. The third zone 408 includes four emitters equipped with an embedded valve, such as that described above for emitters 102, 202, and two multi-port emitters each with an embedded soil moisture valve 704 with conduit outlets 716 at the proper location for watering, as described below with reference to FIG. 11. With this system, the irrigation controller 410 could be eliminated or set to generous watering schedules in that each of the zones 404, 406, 408 are controlled by an on-demand valve. Alternatively, this layout may be used without the controller and electrically controlled zone valves and be controlled solely by the on-demand valves.

Figure 9:
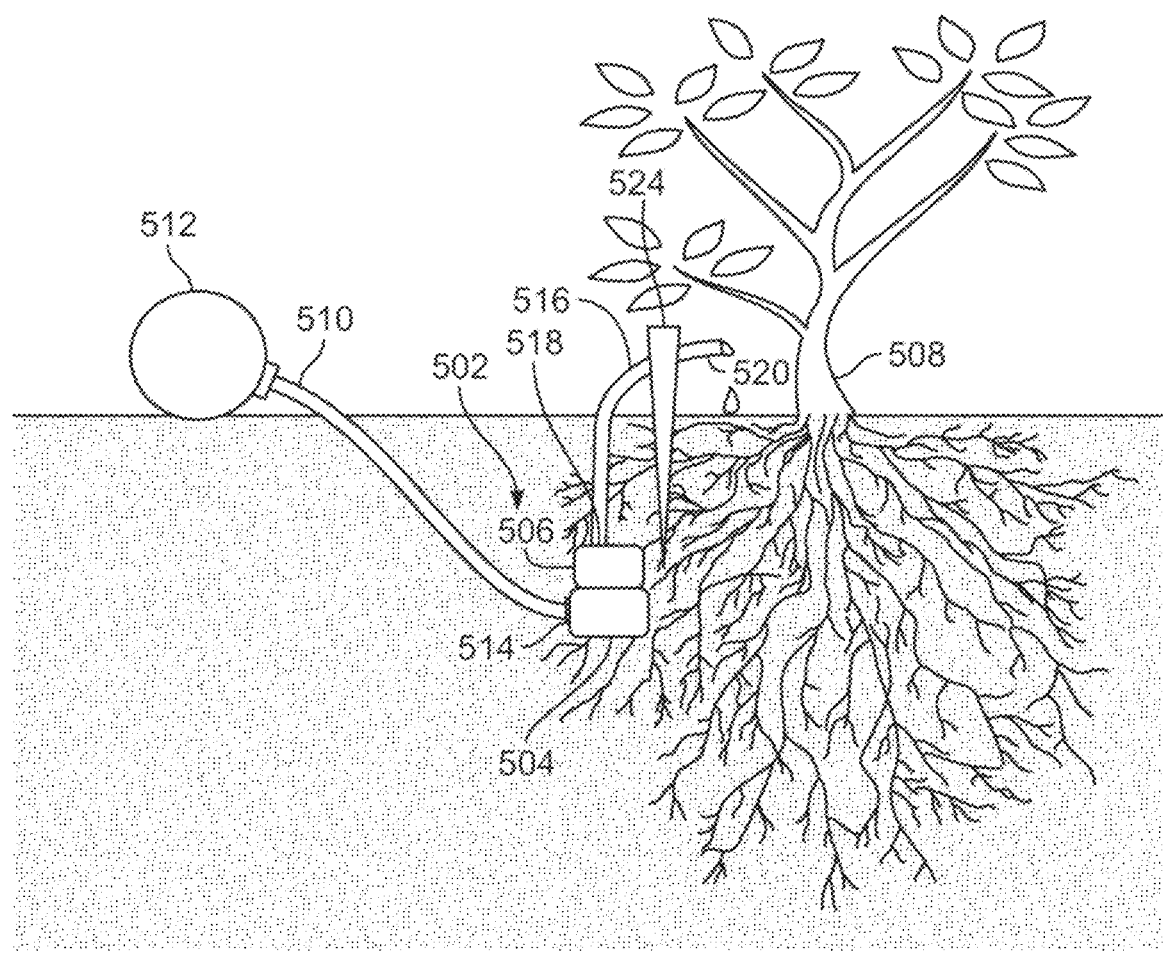
FIG. 9 is an elevational view of a moisture sensing emitter configured for watering.

In FIG. 9, there is shown an application of a combined moisture sensing valve/emitter unit 502. The unit 502 combines the valve 504 with the emitter 506. Examples of such combined units include units 102 and 202 described above. The moisture sensing emitter 502 is buried at a depth and distance from a plant 508 that provides a good indication of the soil moisture levels for that specific plant. One position may be toward the edge of the root cluster and at mid-depth along the root cluster. Other positions may be selected depending on the plant type, soil type, amount of shade or sunlight and other basic factors of the landscape situation. Tubing 510 connects supply tubing 512 to the valve inlet 514. Tubing 516 is connected to an outlet 518 of the emitter 506 which runs to the surface. The outlet tubing 516 should be in a location that would normally be specified for drip irrigation for the plant material with drip irrigation. The tubing's outlet end 520 may be held in position by a stake 524. Additional examples are emitters 102, 202 shown in zone 408 of FIG. 8.

Figure 10:
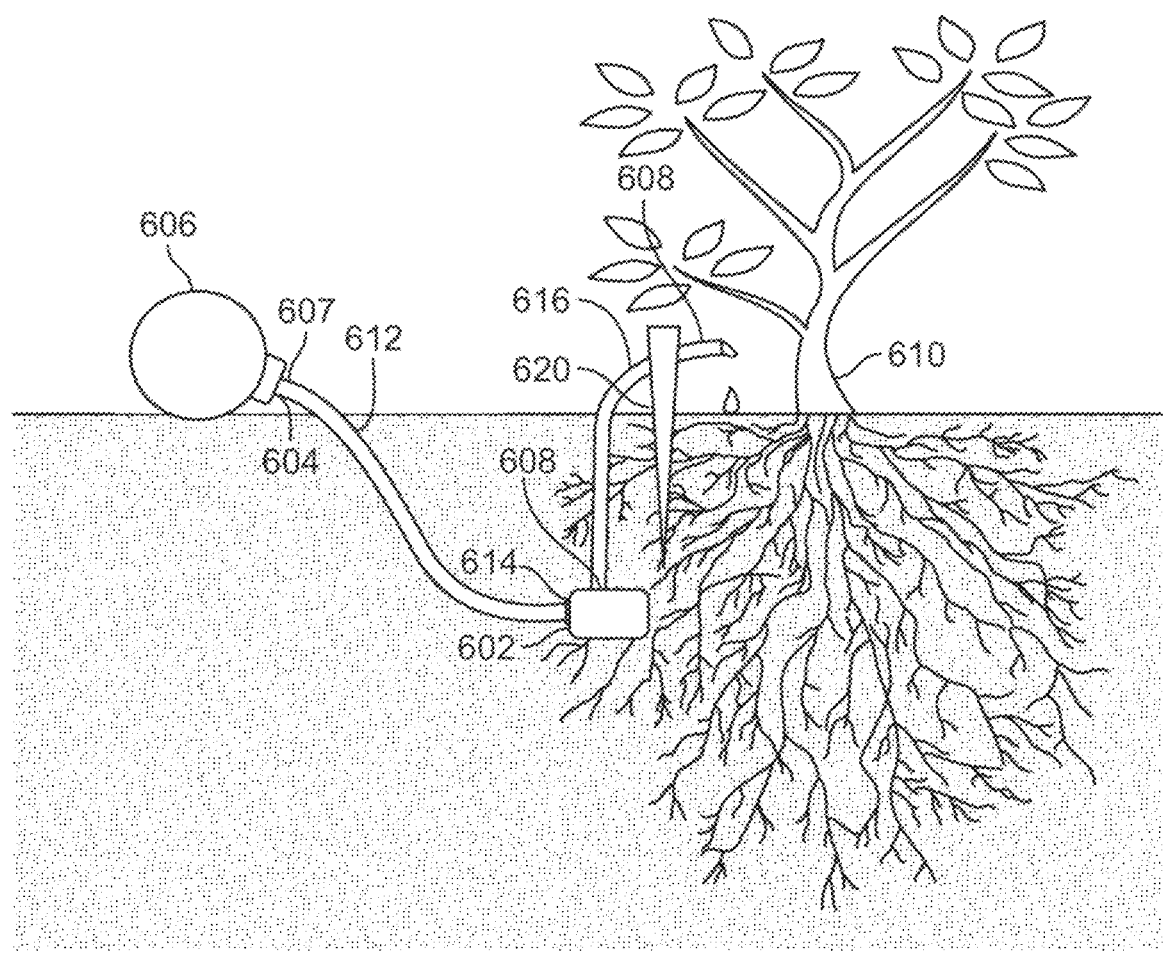
FIG. 10 is an elevational view of a moisture sensing valve configured for watering.

In FIG. 10, there is shown an application of a moisture sensing valve 602, such as, for example, valve 10 described above, and an emitter 604 as a separate unit, such as, for example, Rain Bird's Xeri Bug Drip Emitter (both pressure compensating and non-pressure compensating). The emitter 604 could be installed at the supply tubing 606, as shown, or at the tubing outlet 608 (see, e.g., FIG. 12) at a desired watering location for a particular plant 610. The valve 602 is buried at a depth and distance from the plant 610 that provides a good indication of the soil moisture levels for that specific plant. One position may be toward the edge of the root cluster and at mid-depth along the root cluster. Other positions may be selected depending on the plant type, soil type, amount of shade or sunlight and other basic factors of the landscape situation. Tubing 612 connects the supply tubing 606 from the outlet of the emitter 604 to the inlet 614 of the valve 602. Tubing 616 is connected to an outlet 618 of the valve 602 and runs to the surface. The outlet 608 of the tubing 616 should be in a location that would normally be specified for drip irrigation for the plant 610. The tubing outlet 608 (with or without an emitter) could be held in place using a stake 620.

Figure 11:
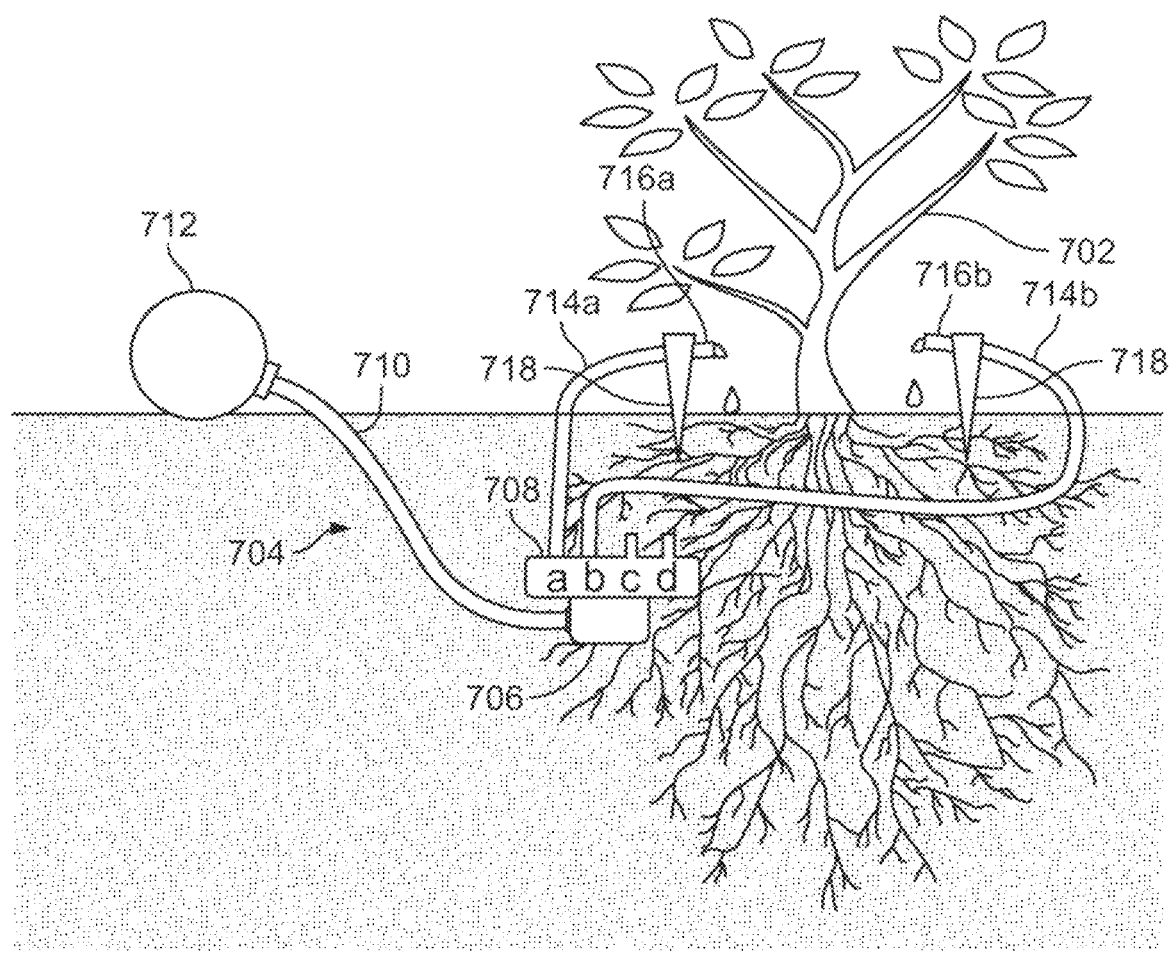
FIG. 11 is an elevational view of a multi-outlet moisture sensing emitter configured for watering.

As illustrated in FIG. 11, multiple emission points may be needed to properly irrigate a larger plant 702. A single multi-outlet valve/emission unit 704 could be used where the soil moisture for the plant was sensed at one location but could allow/disallow irrigation to multiple points from the emitter. More specifically, the single multi-outlet valve/emission unit 704 could contain both the on-off sensing valve 706 which uses swellable material as described above, such as valve 10 or the valves of drip emitters 102 or 202, and the multi-outlet emitter 708, such as, for example, Rain Bird's Multi-Outlet Xeri Bug or EMT-6XERI. The unit 704 is buried at a depth and distance from the plant 702 that provides a good indication of the soil moisture levels for that specific plant. One position may be toward the edge of the root cluster and at mid-depth along the root cluster. Other positions may be selected depending on the plant type, soil type, amount of shade or sunlight and other basic factors of the landscape situation. Tubing or hard plumbing 710 can connect to the unit 704 inlet to a supply line 712. Additional tubing 714*a*, 714*b* is connected to one or more of the multiple outlets denoted as "a"-"d" of the multi-outlet emitter 708. In this example, outlets "a" and "b" are used, while outlets "c" and "d" are not needed for this plant 702. All or at least three of the outlets "a"-"d" can be molded closed from the factory. To open the outlet, the plastic blocking the outlet can be removed by cutting or piercing it open. For example, the plastic blocking outlets "a" and "b" has been removed, while the plastic blocking outlets "c" and "d" remain in place. Alternatively, each outlet could be controlled by an individual valve, such as a ball valve. The tubing 714*a*, 714*b* extends from the outlets "a" and "b" to a location that is specified for the particular plant 702 for drip irrigation. The outlet ends 716*a*, 716*b* of the tubing 714*a*, 714*b* may be held in place with a stake 718 at the position where irrigation is desired. An example is the multi-outlet valve/emission unit 704 in zone 408 of FIG. 8.

Figure 12:
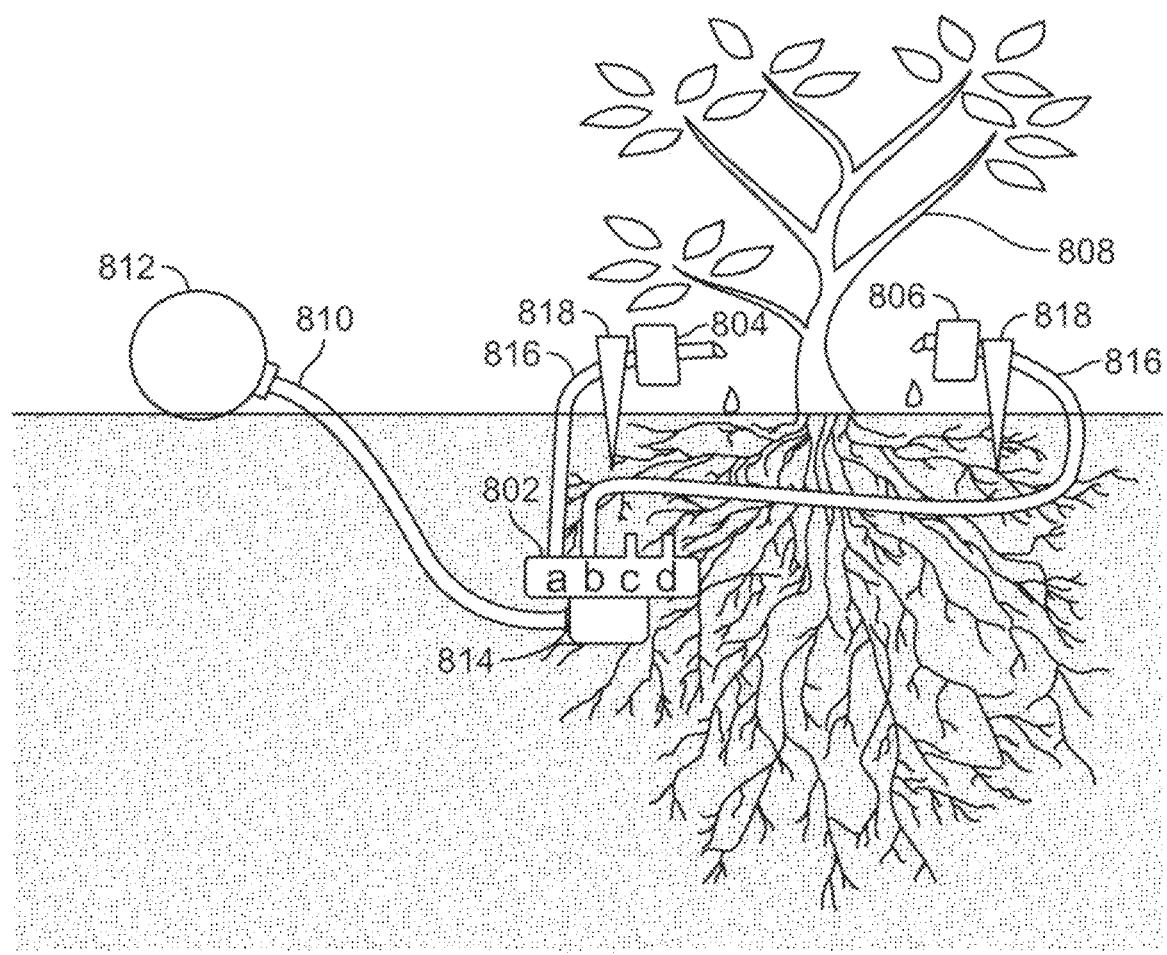
FIG. 12 is an elevational view of a multi-outlet sensing valve configured for watering.

Alternatively, as illustrated in FIG. 12, a multi-outlet moisture sensing valve 802 is shown separate from a set of emitter devices 804, 806. The multi-outlet moisture sensing valve 802 operates using the same swellable materials as described above. For example, it may include a single valve, such as the valve 10 or the valves of drip emitters 102 or 202, that when open supplies a manifold leading to each of the outlets "a"-"d." Alternatively, an individual valve, such as the valve 10, 10A, or the valves of emitters 102, 202, could be supplied for each outlet.

All or least all but one of the outlets can be factory closed during the molding process and opened during installation as needed. For instance, as illustrated in FIG. 12, only outlets "a" and "b" would be opened by removing the blockage through cutting or piercing and the other two, "c" and "d," would remain molded shut. Alternatively, each of the outlets could be associated with a manual valve, such as a ball valve, to open and close the outlet.

The multi-outlet moisture sensing valve 802 is buried at a depth and distance from a plant 808 that provides a good indication of the soil moisture levels for that specific plant. One position may be toward the edge of the root cluster and at mid-depth along the root cluster. Other positions may be selected depending on the plant type, soil type, amount of shade or sunlight and other basic factors of the landscape situation. Tubing or hard plumbing 810 can connect to a supply tube 812 and an inlet 814 of the multi-outlet moisture sensing valve. Tubing 816 is connected to one or multiple outlets of the multi-outlet sensing valve 802. In this example outlets "a" and "b" are used, but outlets "c" and "d" are not needed for this plant. The outlet ends of the tubing 816 and their attached emitter devices 804, 806 should be positioned at a location specified for the plant 808 for drip irrigation and may be held in place with a stake 818. An example is the multi-outlet soil moisture valve unit 802 and emitters 806 in zone 406 of FIG. 8.

FIGS. 16-20 show alternative embodiments to the moisture sensing valve and emitter units shown in FIGS. 9-12. As addressed below, in these alternative embodiments, the valves and emitters have been combined with the stakes to form an integrated unit. Other than this integration, the remainder of the discussion relating to FIGS. 9-12 applies generally to FIGS. 16-20.

Figure 16:
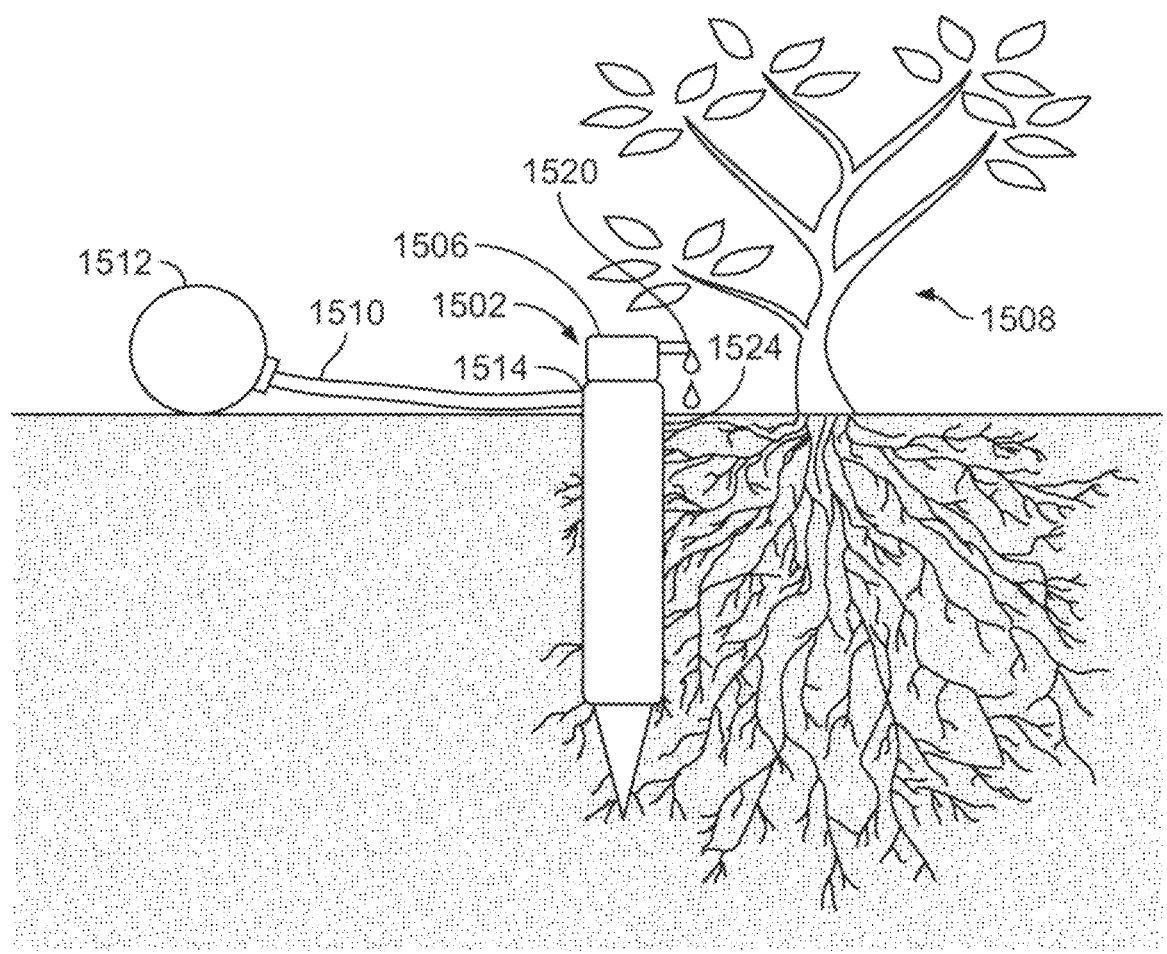
FIG. 16 is an elevational view of a moisture sensing emitter stake unit configured for watering.
Figure 17:
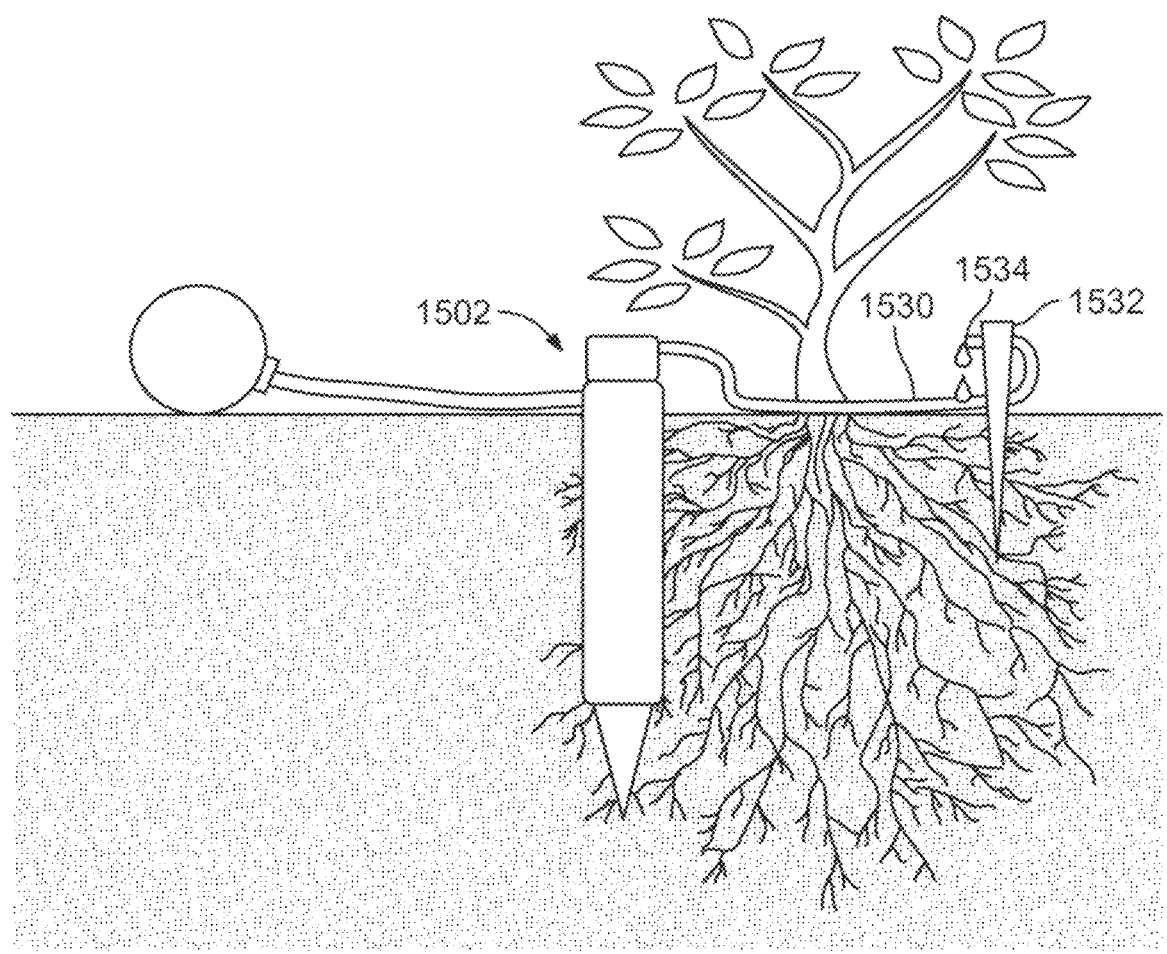
FIG. 17 is an elevational view of an alternative embodiment of a moisture sensing emitter stake unit configured for watering.

In FIG. 16, there is shown an application of an integrated moisture sensing emitter stake unit 1502. The unit 1502 combines the valve with the stake 1524 (such as, for example, valves 10, 10A described above), and also with the emitter 1506. The moisture sensing emitter stake unit 1502 is buried at a depth and distance from a plant 1508 that provides a good indication of the soil moisture levels for that specific plant. Tubing 1510 connects supply tubing 1512 to the valve inlet 1514. The tubing's outlet end 1520 at the emitter 1506 is held in position by the stake 1524. FIG. 17 shows an additional embodiment making use of tubing 1530 from the stake unit 1502 to a second stake 1532 supporting the outlet end 1534.

Figure 18:
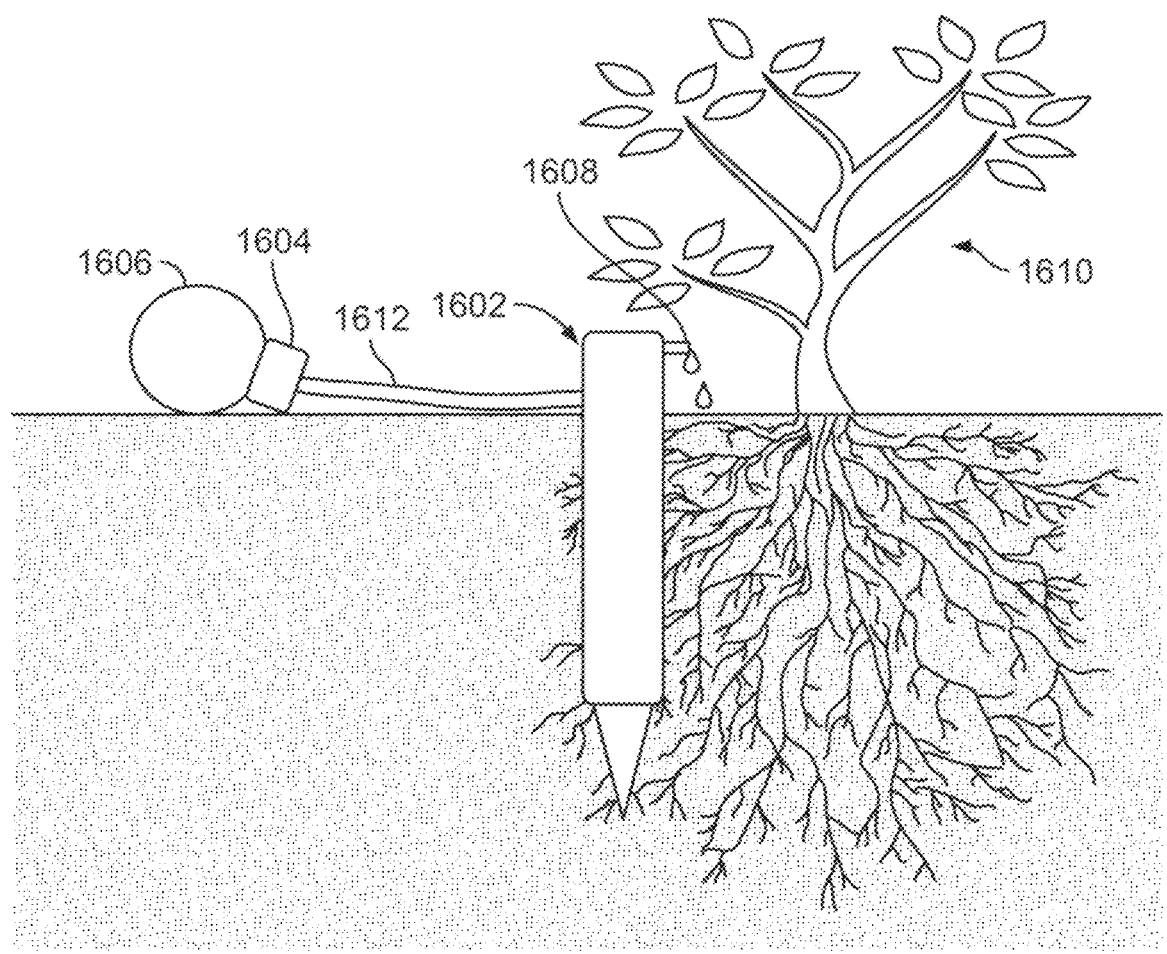
FIG. 18 is an elevational view of a moisture sensing valve stake unit configured for watering.

In FIG. 18, there is shown an application of an integrated moisture sensor valve stake unit 1602, such as, for example, valves 10, 10A described above, and an emitter 1604 as a separate unit, such as, for example, Rain Bird's Xeri Bug Drip Emitter (both pressure compensating and non-pressure compensating). The emitter 1604 could be installed at the supply tubing 1606, as shown, or at the tubing outlet 1608 (see, e.g., FIG. 20) at a desired watering location for a particular plant 1610. Tubing 1612 connects the supply tubing 1606 from the outlet of the emitter 1604 to the inlet of the valve 602. The valve 1602 is buried at a depth and distance from the plant 1610 that provides a good indication of the soil moisture levels for that specific plant.

Figure 19:
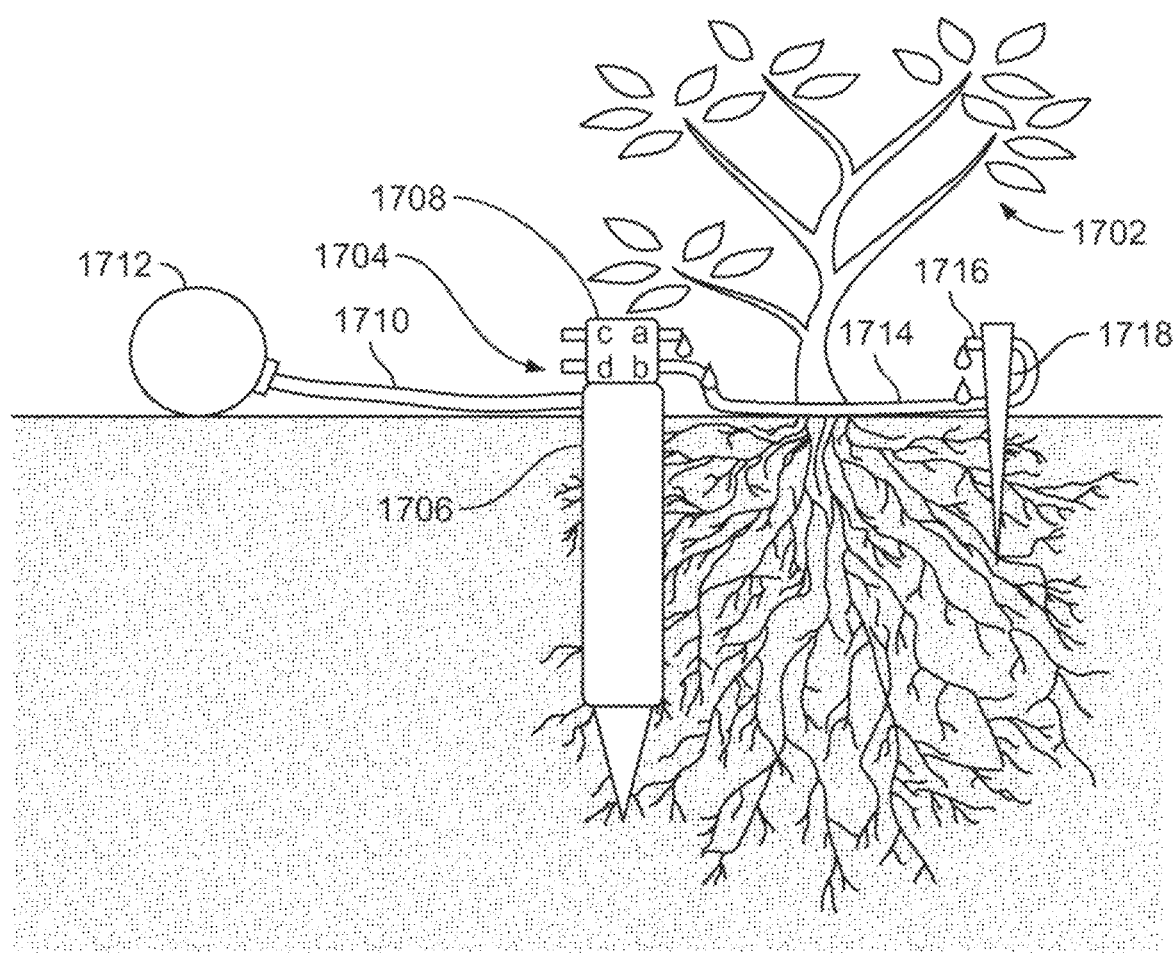
FIG. 19 is an elevational view of a multi-outlet moisture sensing emitter stake unit configured for watering.

As illustrated in FIG. 19, multiple emission points may be needed to properly irrigate a larger plant 1702. An integrated multi-outlet moisture sensing emitter stake unit 1704 could be used where the soil moisture for the plant was sensed at one location but could allow/disallow irrigation to multiple points from the emitter. More specifically, the single multi-outlet valve/emission unit 1704 could contain both the on-off sensing stake valve 1706 which uses swellable material as described above, such as stake valves 10, 10A, and the multi-outlet emitter 1708, such as, for example, Rain Bird's Multi-Outlet Xeri Bug or EMT-6XERI. The unit 1704 is buried at a depth and distance from the plant 1702 that provides a good indication of the soil moisture levels for that specific plant. Tubing or hard plumbing 1710 can connect to the unit 1704 inlet to a supply line 1712. Additional tubing 1714 is connected to one or more of the multiple outlets denoted as "a"-"d" of the multi-outlet emitter 1708. In this example, outlets "a" and "b" are used, while outlets "c" and "d" are not needed for this plant 1702. Outlets "a" and "b" are opened and "c" and "d" remain closed as discussed above. The tubing 1714 extends from the outlet "b" to a location that is specified for the particular plant 1702 for drip irrigation. The outlet end 1716 of the tubing 1714 may be held in place with a second stake 1718 at the position where irrigation is desired.

Figure 20:
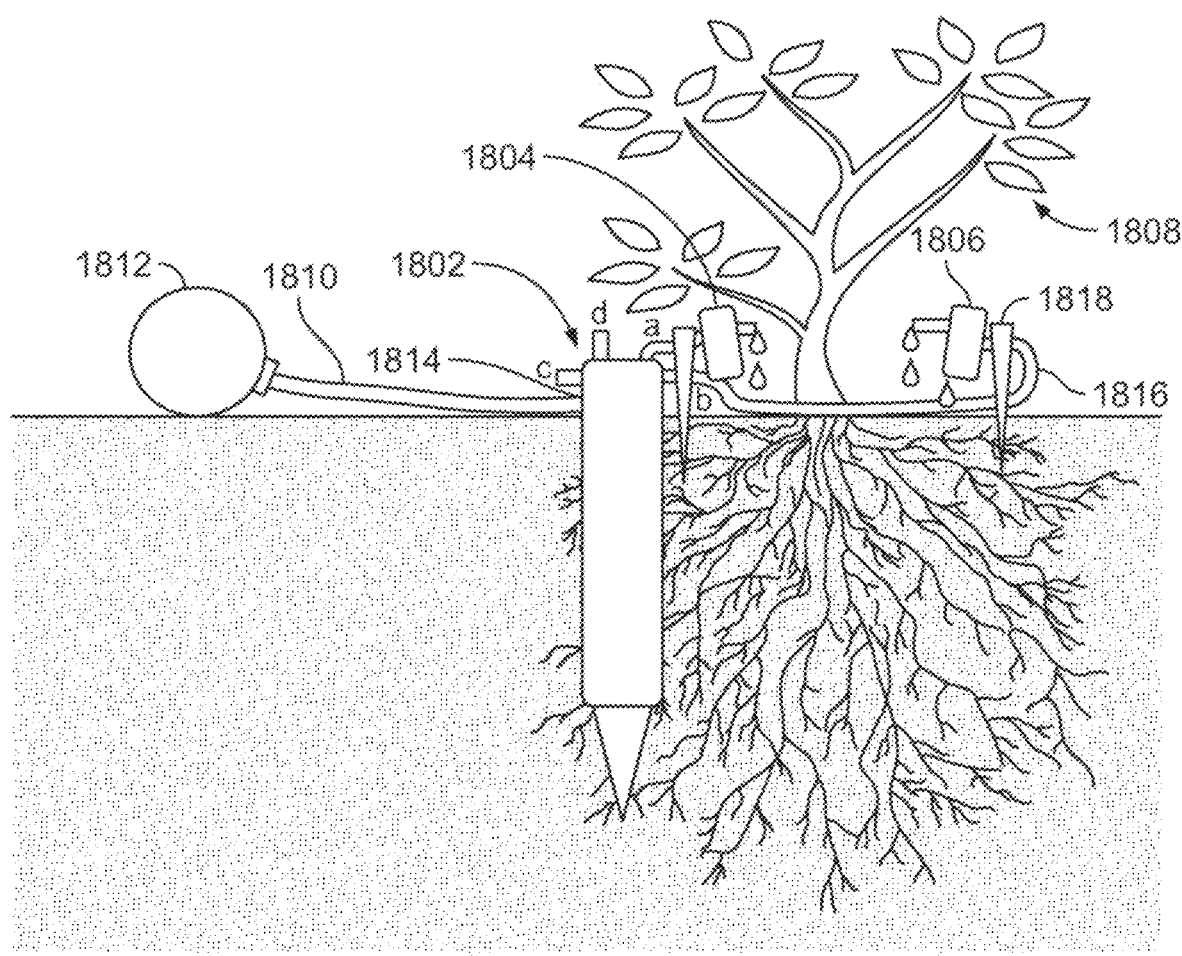
FIG. 20 is an elevational view of a multi-outlet moisture sensing valve stake unit configured for watering.

Alternatively, as illustrated in FIG. 20, an integrated multi-outlet moisture sensing valve stake unit 1802 is shown separate from a set of emitter devices 1804, 1806. The multi-outlet moisture sensing valve stake unit 1802 operates using the same swellable material as described above. For example, it may include a single valve, such as the valves 10, 10A, that when open supplies a manifold leading to each of the outlets "a"-"d." Alternatively, an individual valve, such as the valves 10, 10A, could be supplied for each outlet. The multi-outlet moisture sensing valve stake unit 1802 is buried at a depth and distance from a plant 1808 that provides a good indication of the soil moisture levels for that specific plant. Tubing or hard plumbing 1810 can connect to a supply tube 1812 and an inlet 1814 of the multi-outlet moisture sensing valve stake unit 1802. Tubing 1816 is connected to one or multiple outlets of the multi-outlet sensing valve 1802. In this example outlets "a" and "b" are used (open), but outlets "c" and "d" are not needed for this plant (remain closed). The outlet ends of the tubing 1816 and their attached emitter devices 1804, 1806 should be positioned at a location specified for the plant 1808 for drip irrigation and may be held in place with a second stake 1818.

Figure 25:
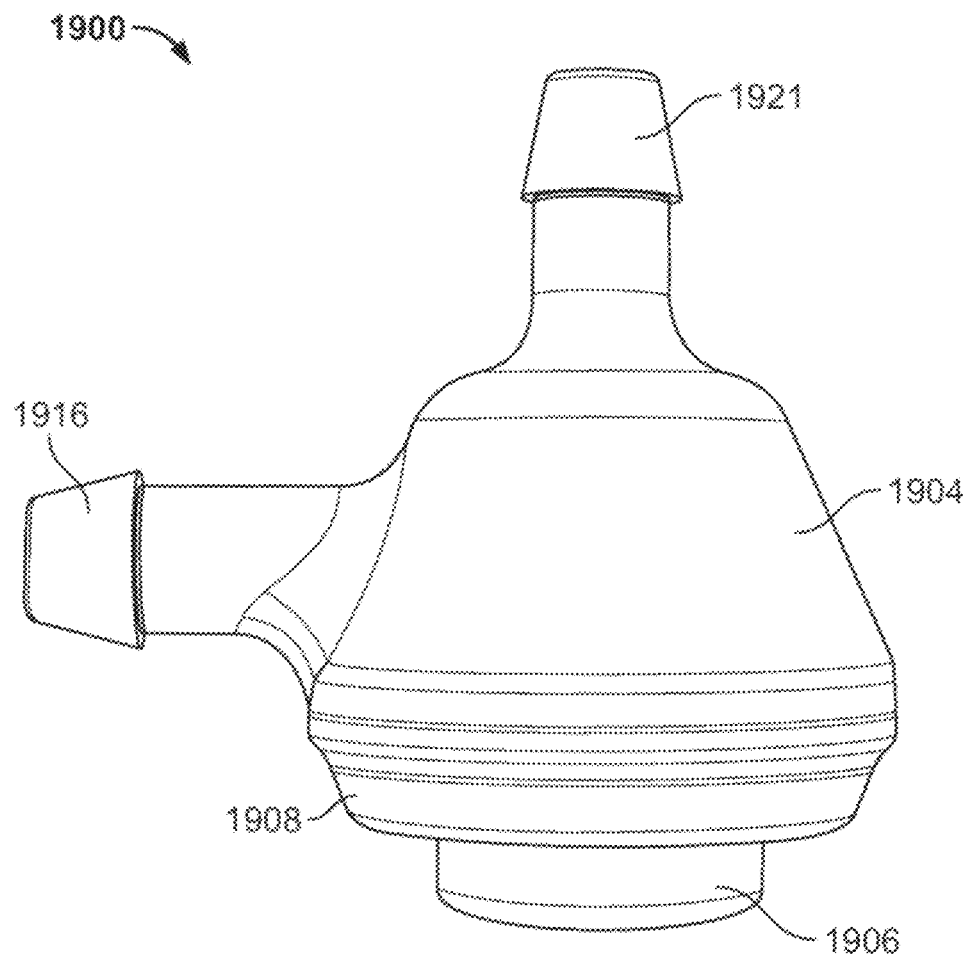
FIG. 25 is a perspective view of an alternative embodiment of a moisture sensing valve.
Figure 26:
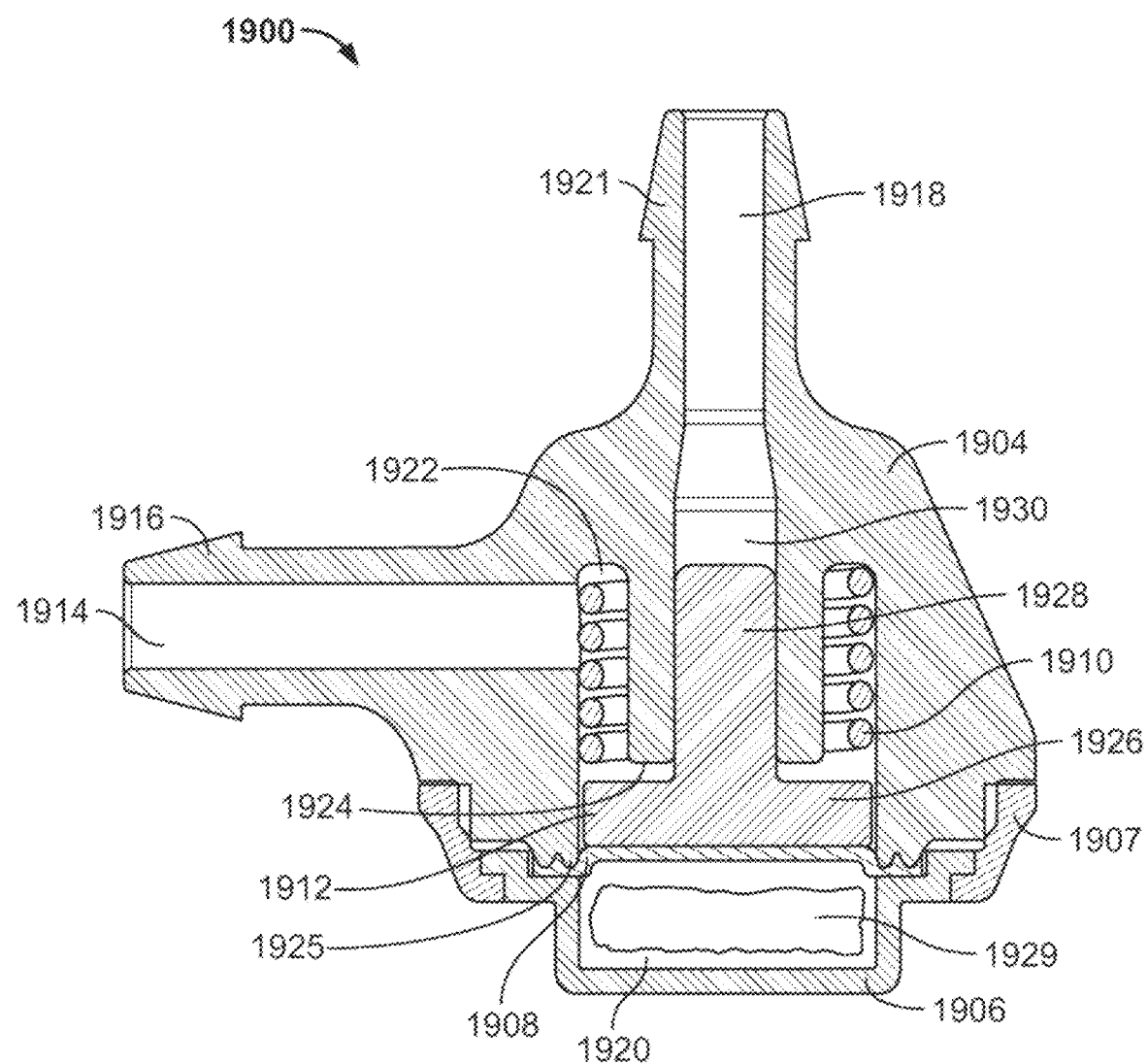
FIG. 26 is a cross-sectional view of the moisture sensing valve of FIG. 25 in an open state.
Figure 27:
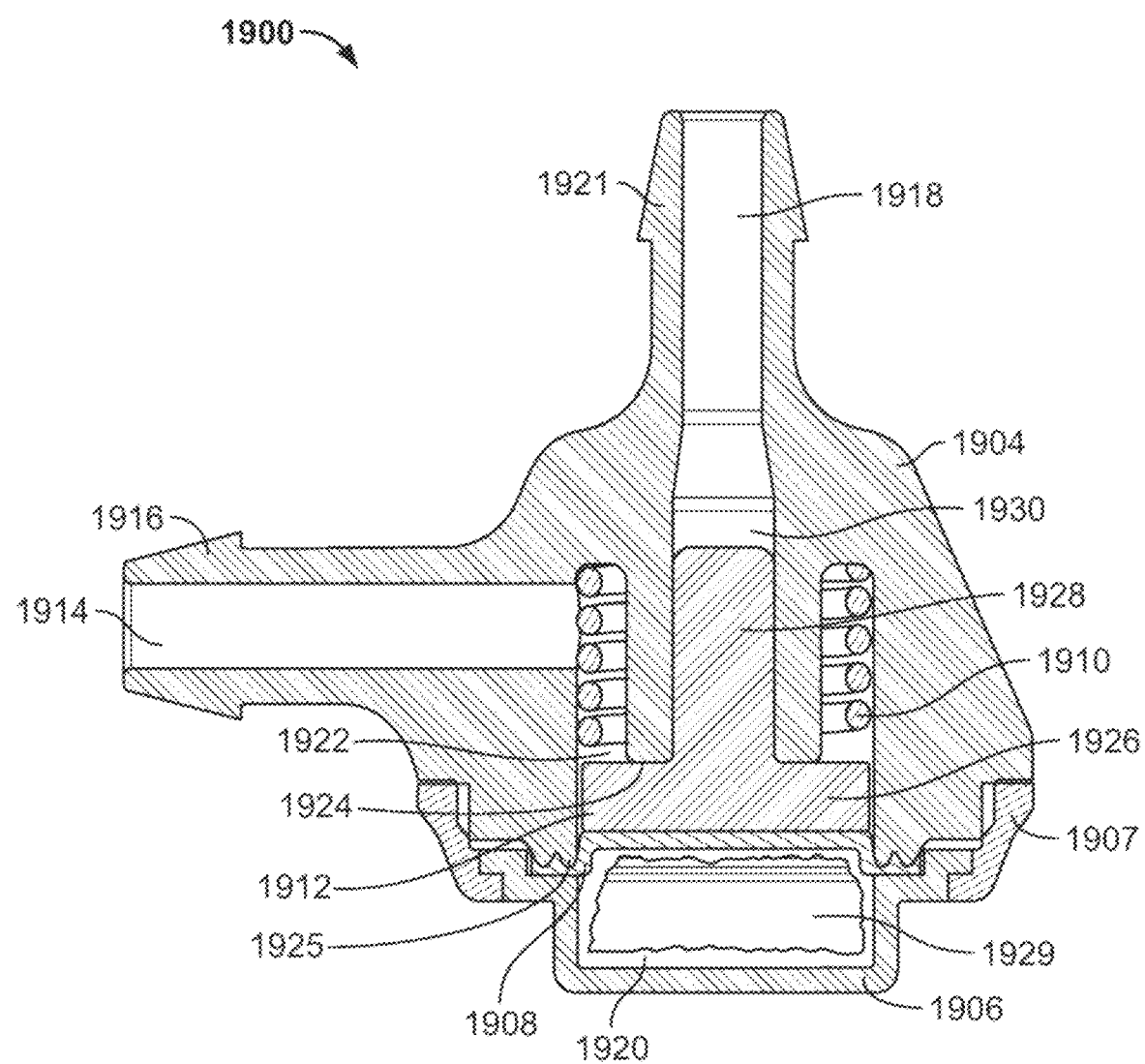
FIG. 27 is a cross-sectional view of the moisture sensing valve of FIG. 25 in a closed state.

Another example of a moisture sensing valve 1900 is shown in FIGS. 25-27. The valve 1900 operates using swellable materials that swell in response to moisture to close the valve 1900 and that contract (or do not swell) in the absence of moisture to open the valve 1900. The valve 1900 opens and closes based on the use and operation of the swellable materials described above.

In this example, the valve 1900 includes a valve body 1904, a porous chamber 1906, a retainer 1907 for retaining the porous chamber 1906 to the valve body 1904, a diaphragm 1908, a spring 1910, and a piston/plunger 1912. The valve body 1904 includes an inlet defined by an inlet passage 1914 and a first barb 1916 that may be connected to tubing. The valve body 1904 further includes an outlet defined by an outlet passage 1918 and second barb 1921 for delivering water from the valve 1900. The valve 1900 opens and closes between the inlet and outlet passages 1914, 1918 and provides on-demand irrigation by the valve 1900.

The diaphragm 1908 is mounted within the valve body 1904 and separating an expandable chamber 1920 (defined by the porous chamber 1906 and diaphragm 1908) from the remainder of the body 1904. The inlet passage 1914 leads into an annular inlet chamber 1922, which is defined by the valve body 1904 and the plunger 1912 (mounted within the valve body 1904). The diaphragm 1908 is disposed on one side of the plunger 1912 (beneath the plunger 1912) and is configured to urge the plunger 1912 toward a valve seat 1924.

Acting in opposition, the spring 1910 is disposed in the annular inlet chamber 1922 and is configured to naturally bias the plunger 1912 away from the valve seat 1924. The spring 1910 shown in FIGS. 26 and 27 is a coil spring, but any of various spring types may be used. The action of the diaphragm 1908 and spring 1910 against the plunger 1912 urges the plunger 1912 toward or away from the valve seat 1924 to control flow through the valve 1900. As described below, the elasticity/spring constant of the diaphragm 1908 and the elasticity/spring constant of the spring 1910 may be selected so that the valve 1900 is open when the soil is relatively dry and the valve is closed when the soil is sufficiently moist. The valve body 1904 may include one or more projecting annular ribs 1925 that press into the diaphragm 1908 to pinch the diaphragm 1908. These ribs 1925 seal the body 1904 at the diaphragm 1908 and prevent the diaphragm 1908 from shifting.

In this form, the porous chamber 1906 defining part of the expandable chamber 1920 is in the shape of a permeable cup-shaped wall that allows water to enter the expandable chamber 1920 through the soil. A swellable material (not shown), such as, for example, a hydrophilic polymer, preferably a thermoplastic elastomer, or any of the other swellable materials disclosed above, is deposited in the expandable chamber 1920. In one form, the swellable material may be made of flexible polyether and rigid polyamide, such as a polyether block amide, or particles of such materials as explained above. The swellable material is contained in the expandable chamber 1920 between the diaphragm 1908 and the porous chamber 1906. The porous chamber 1906 allows bidirectional flow of moisture but retains the swellable material within the expandable chamber 1920. A retainer 1907 secures the porous chamber 1906 to the valve body 1904. In this form, the retainer 1907 may be annular in shape with an annular flange that engages and supports a corresponding annular lip of the porous chamber 1906. In one form, it is contemplated that the retainer 1907 is attached to the valve body 1904 by ultrasonic welding, but other manner of attachment may also be used. For example, the manner of securement may also be done by other conventional techniques, such as a weld, a friction fit, a snap fit, an adhesive, or forming screw threads on the retainer 1907 and valve body 1904.

Figure 28:
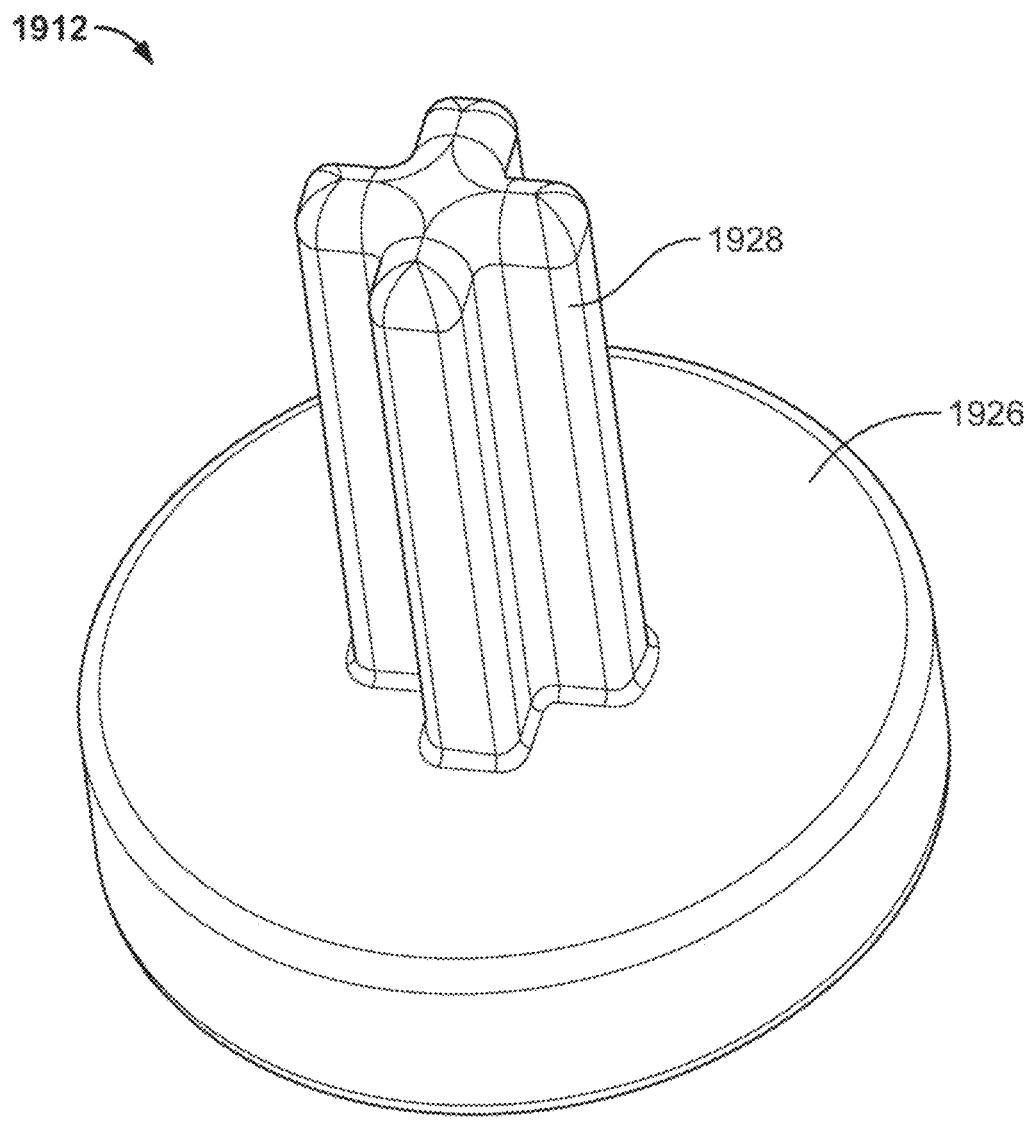
FIG. 28 is a perspective view of an embodiment of a plunger of the moisture sensing valve of FIG. 25.

FIG. 26 shows the valve 1900 in an open configuration. In the open configuration, the soil is relatively dry such that it requires irrigation. Initially, water enters the inlet via inlet passage 1914. In this circumstance, because the soil is dry, the swellable material does not react to moisture such that it has not swollen, and therefore, it does not push upwardly against the diaphragm 1908. In turn, the diaphragm 1908 does not push upwardly against the plunger 1912 and may be in its lowermost position. As a result, the force of the spring 1910 is unopposed (or insufficiently opposed), and the spring 1910 urges the plunger 1912 downwardly away from the valve seat 1924. In this form, the plunger 1912 includes a disk-shaped lower portion 1926 and an upper portion 1928 that extends into a transfer passage 1930 leading to the outlet passage 1918. The upper portion 1928 may have any of various shapes and cross-sections so that it does not completely block and occupy the transfer passage 1930. In the example herein, as shown in FIG. 28, the upper portion 1928 has a "+" or "x" shaped cross-section that permits water to flow through the transfer passage 1930. Accordingly, when the spring 1910 biases the plunger 1912 away from the valve seat 1924, water flows through the inlet passage 1914, into the annular inlet chamber 1922, between the valve seat 1924 and disk-shaped lower portion 1926 (of the plunger 1912), into transfer passage 1930 (not occupied by the upper portion 1928 of the plunger 1912), and out through the outlet passage 1918.

As the soil becomes increasingly moist, the swellable material expands in volume and urges the diaphragm 1908 upwardly against the plunger 1912. In response, the lower portion 1926 of the plunger 1912 will begin to move towards the valve seat 1924 to close the valve 1900. When the soil is sufficiently moist and the swellable material has expanded a sufficient volume, the diaphragm 1908 will urge the plunger 1912 against the valve seat 1924. It should be evident that the elasticity/spring constants of the diaphragm 1908 and spring 1910, respectively, may be selected to open and close the valve 1900 at desired soil moisture/dryness levels. However, it has generally been found that the expansion force of some swellable materials may be sufficiently strong that the exact elasticity/spring constants are less significant.

FIG. 27 shows the valve 1900 in a closed configuration. In the closed configuration, the soil is relatively moist such that irrigation is not desired. Initially, water enters the inlet via inlet passage 1914 and flows into annular inlet chamber 1922. In this circumstance, because the soil is moist, the swellable material has reacted to the moisture such that it has increased in volume and pushed upwardly against the diaphragm 1908. In turn, the diaphragm 1908 has pushed upwardly against the plunger 1912 and may be in its uppermost position. As a result, the force of the spring 1910 is overcome, and the diaphragm 1908 urges the plunger 1912 upwardly against the valve seat 1924 to close the valve 1900. Accordingly, the flow of water past the annular inlet chamber 1922 is blocked.

The valve 1900 may generally be used in conjunction with the emitters and devices described above. For example, the valve 1900 may be used in the device illustrated in FIG. 10. More specifically, the valve 1900 may simply replace the valve 602 shown in FIG. 10 to operate near the specific plant shown therein.

In one form, it is also contemplated that the swellable material may be converted from a powder form to a more consolidated pill form. Some of the swellable materials addressed earlier in this disclosure are preferably in the form of a powder (or loosely arranged collection of particles) where the individual particles "swell" (or expand) when exposed to moisture. During manufacturing, this powder is incorporated into the expandable chambers of the valves, emitters, and other devices addressed herein. It has been found that the incorporation of this powder into these chambers (such as expandable chamber 1920) during the manufacturing process may be a messy and inefficient process in which some of the powder may be wasted and may be transferred to individuals and areas outside of the chamber 1920. It may therefore be desirable to provide an alternative delivery form.

In one form, the swellable material may be converted to a more rigid pill (or puck) form that is sized to fit in the chamber 1920. Under this approach, the powder may be compressed under pressure and temperature generally to the shape and size of the chamber 1920. In one form, it is contemplated that the pill form is slightly smaller in shape and size than the chamber 1920 so as to provide clearance when the pill is formed and inserted into the chamber 1920 during the manufacturing process. In another form, it is also contemplated that the chamber 1920 itself could be used to compress the swellable material into a pill shape. As described further below, this pill form is generally an intermediate form to provide more ease and convenience during assembly and manufacturing, and the pill form will tend to return to a powder form following exposure to moisture.

It has generally been found that heating the particles of some swellable materials (such as thermoplastic elastomeric materials) will cause the particles to adhere to one another.

It has generally been found that a temperature range of about 150° C. to 160° C. is effective to cause this adherence, and temperatures in the range will generally cause the material to be soft and the particles to be mashed together. However, it is desirable to avoid exceeding the melting point of the swellable materials (which may be around 200° C. to 210° C.) because this temperature will generally transform the materials into a solid, less flexible mass that will resist changing shape (e.g., the swelling capability of the material will be inhibited). As one example, the melting point of Pebax® MH 1657 is about 204° C. In the desired form, the material is formed into a pill body that is more easily handled in the manufacturing process. In other words, the swellable material is preferably in a rigid enough form so as to be usable in an automated assembly process for making the valves, emitters, and other devices.

An example of an approach for producing the swellable material in pill form is described as follows. Initially, the swellable material in powder form may be dried according to any conventional drying process for injection moldable materials. The exact amount of powder needed in forming a pill may be weighed/measured (such as, for example, 120 milligrams) and transferred to a mold/form. As should be apparent, the mold/form may have multiple mold cavities (such as defined by a first mold member) to facilitate the formation of a number of pills at one time. The mold cavities are preferably slightly oversized (relative to the desired final size) to hold the powder in uncompressed form because the powder will tend to compress during the molding process. The mold may then be closed (such as by a second mold member), a temperature may then be applied or maintained at the mold (such as 150° C. to 160° C.), and the mold may be held in the desired form for a certain period of time (such as ten seconds). The specific operational parameters depend on the nature of the swellable material and the desired size and shape of the pill, but in one form, it is generally contemplated that about 120 milligrams of powder may be heated in a mold to about 150° C. to 160° C. for a few seconds to form a disk-shaped pill.

After being deposited in the chamber 1920, the pill or puck will generally remain in a pill form until first installed into moist soil, at which time it will tend to break apart back into powder form. The powder form is one desired form as discussed in paragraph [0043]. In other words, the swellable material will tend to crumble into the individual particles that will tend to swell in the presence of moisture. The conversion of the swellable material from powder to pill form does not interfere, alter or affect the desired operation of the material. Further, as addressed, the ability to form the swellable material into a rigid or semi-rigid pill form provides advantages and benefits during the manufacturing/assembly process.

This method is also desirable as opposed to other methods of forming pills that will break apart or dissolve under specific conditions, such as pill forming methods used in the production of pills for medicines. Those methods require dissolvable binders to form and hold the form of the pill and retain the drug within the pill. For application herein, the addition of binders would be problematic since the extra volume taken up by such binders is significant and could prevent enough swellable material to be delivered to the expandable chamber 1920 such that not enough expansion/contraction of the swellable material would be realized after the binder had dissolved away. Also, concerns with whether the time the binder would take to dissolve would hinder operation of the valve 1900 and if the binders would clog or hinder the function of the valve 1900 were such that a method was desired to temporarily bind the powder together without such added intermediate materials. It is contemplated that this conversion to a pill form may be applied to all embodiments of valves, emitters, and devices described herein and is not limited to any particular embodiment.

As should be evident, there are a number of modifications and additions that may be made to the devices described in this application. The devices may be in various preferred product forms, such as buried devices, integrated into a stake, etc. The valve functionality may be adjusted as desired, such as a valve adjustable between fully on and off positions or a valve with flow varying from fully open to just shy of fully closed. Further, the devices may be modified to accommodate their operating environments, including different temperatures, soil types, plant types, maximum and minimum required flow capability, etc. The devices may also be modified so as to accommodate any of various installation methods. Moreover, they may include some type of indicators and methods for detecting the presence of the device or showing that the device has been installed and is functional. In addition, it is contemplated that a type of installation tool and method may be used to ensure the device is buried at a desired depth.

There are additional options and embodiments available that may be used in other irrigation contexts. For example, the devices addressed above may be adapted for use in a rain sensor design, such as by generally mounting the device in a cup receiving rainfall. Additional examples include using the devices to get an understanding of different moisture levels at different depth levels or across a terrain. For instance, a user may utilize multiple sensing members spaced out along a vertical shaft in order to understand the water profile at different depths and to understand the movement of water through the soil, such as for agriculture applications. Alternatively, a user may utilize multiple sensors spread out in a grid or on a flexible tube that could be buried at one depth to provide an understanding of the moisture levels around a plant or among many plants.

Further, as addressed above to some extent, the devices may be adapted for use in simply monitoring soil moisture levels, not necessarily requiring a connection to an irrigation system, controller, or valve. The devices may be used as part of instruments with onboard displays or other graphical user interfaces or that are able to communicate with such displays or graphical user interfaces, which can be read by an individual or connected to some data collection system. There are applications for laboratory or remote data collection that are directed to monitoring soil moisture levels, not controlling or regulating an irrigation system.

It will be understood that various changes in the details, materials, and arrangements of parts and components which have been herein described and illustrated by way of example in order to explain the nature of the subject matter may be made by those skilled in the art within the principles and scope of the invention as expressed in the appended claims. Furthermore, while various features have been described with regard to a particular embodiment, it will be appreciated that features described for one embodiment also may be incorporated into the other described embodiments.

What is claimed is:
1. An on-demand irrigation system comprising:
   a water source;
   a valve receiving water from the water source;
   a pilot valve controlling operation of the valve and providing on-demand control of the valve, the pilot valve comprising:

a pilot valve inlet in fluid communication with the valve and configured to receive fluid from the valve;
a pilot valve outlet in fluid communication with the valve and configured to direct fluid downstream of the valve;
a pilot valve seat intermediate the pilot valve inlet and the pilot valve outlet;
a pilot valve member biased away from the valve seat to an open position and biased against a closed position; and
a swellable material in operational engagement with the pilot valve member to move the pilot valve member relative to the pilot valve seat between the open position and the closed position;
wherein, when the swellable material is swollen in response to moisture to close the pilot valve, water flow from the pilot valve outlet to the valve is shut off and closes the valve;
wherein, when the swellable material is not swollen such that the pilot valve is in an open position, water flows from the pilot valve outlet to the valve and opens the valve.

2. The on-demand irrigation system of claim 1, wherein the pilot valve member comprises a plunger.

3. The on-demand irrigation system of claim 1, wherein the pilot valve member comprises a diaphragm.

4. The on-demand irrigation system of claim 1, wherein the swellable material contracts in response to a reduction in soil matric potential to a value within the range of about −130 kPa to −90 kPa.

5. The on-demand irrigation system of claim 1, wherein the swellable material is made of a flexible polyether and rigid polyamide.

6. The on-demand irrigation system of claim 1, wherein at least a portion of the swellable material is a polyether block amide.

7. The on-demand irrigation system of claim 1, wherein the swellable material is in a powdered form wherein the particle size is in the range of about 500 microns or less.

8. The on-demand irrigation system of claim 1, wherein, when heated within a range of 150° C. to 160° C., the swellable material transforms from a powdered state to adhere and form a single, unitary body.

9. The on-demand irrigation system of claim 1, wherein the pilot valve is downstream of the valve relative to the water source.

10. The on-demand irrigation system of claim 1, wherein:
the valve comprises a valve inlet, a valve outlet, a pressure chamber, and a valve member being moveable relative to a valve seat to open and close the valve;
the valve inlet being in fluid communication with the pressure chamber.

11. The on-demand irrigation system of claim 1, wherein:
the valve comprises a valve inlet, a valve outlet, a pressure chamber, and a valve member being moveable relative to a valve seat to open and close the valve;
one side of the valve member facing the valve seat and the other side facing the pressure chamber.

12. The on-demand irrigation system of claim 1, wherein:
the valve comprises a valve inlet, a valve outlet, a pressure chamber, and a valve member being moveable relative to a valve seat to open and close the valve;
the pilot valve receives fluid from the pressure chamber.

13. The on-demand irrigation system of claim 1, wherein the valve comprises:
a valve body defining a valve inlet and a valve outlet;
a valve seat intermediate the valve inlet and the valve outlet;
a valve member biased toward the valve seat to a closed position and biased away from an open position;
a pressure chamber defined by the valve body and the valve member; and
an elastic member positioned in the pressure chamber biasing the valve member toward the valve seat to the closed position.

14. The on-demand irrigation system of claim 13, wherein:
when the swellable material is swollen in response to moisture to close the pilot valve, water flow from the pilot valve outlet to the valve is shut off and pressure in the pressure chamber, coupled with the bias of the elastic member, seats the valve member on the valve seat to close the valve; and
when the swellable material is not swollen such that the pilot valve is in the open position, water flows from the pilot valve outlet to the valve, and pressure in the pressure chamber decreases, such that water from the valve inlet overcomes the bias of the elastic member and moves the valve member away from the valve seat to open the valve.

15. The on-demand irrigation system of claim 1, wherein the swellable material is in the form of a single, unitary body.

16. The on-demand irrigation system of claim 15, wherein the single, unitary body is a temporary, intermediate form and the swellable material transforms, at least in part, to a powdered state following exposure to moisture.

17. An on-demand irrigation system comprising:
a water source;
at least one irrigation zone receiving water from the water source, the at least one irrigation zone comprising at least a first irrigation zone;
an irrigation controller controlling at least one control valve, each control valve corresponding to one of the at least one irrigation zones;
a plurality of subzone valves disposed in the first irrigation zone and each irrigating a subzone in the first irrigation zone;
at least one pilot valve in the first irrigation zone controlling operation of each of the subzone valves and providing on-demand control of each of the subzone valves, each pilot valve comprising:
a pilot valve inlet in fluid communication with a corresponding subzone valve and configured to receive fluid from the corresponding subzone valve;
a pilot valve outlet in fluid communication with the corresponding subzone valve and configured to direct fluid downstream of the corresponding subzone valve;
a pilot valve seat intermediate the pilot valve inlet and the pilot valve outlet;
a pilot valve member biased away from the valve seat to an open position and biased against a closed position; and
a swellable material in operational engagement with the pilot valve member to move the pilot valve member relative to the pilot valve seat between the open position and the closed position;
wherein, when the swellable material is swollen in response to moisture to close the pilot valve, water flow from the pilot valve outlet to the corresponding subzone valve is shut off and closes the corresponding subzone valve;

wherein, when the swellable material is not swollen such that the pilot valve is in an open position, water flows from the pilot valve outlet to the corresponding subzone valve and opens the corresponding subzone valve.

18. The on-demand irrigation system of claim 17, wherein the at least one pilot valve in the first irrigation zone is a single pilot valve disposed in each subzone.

19. The on-demand irrigation system of claim 17, wherein the at least one pilot valve in the first irrigation zone is a single pilot valve disposed in the first irrigation zone.

20. The on-demand irrigation system of claim 17, further comprising:
- a second irrigation zone receiving water from the water source;
- a plurality of subzone valves disposed in the second irrigation zone and each irrigating a subzone in the second irrigation zone;
- at least one pilot valve in the second irrigation zone controlling operation of each of the subzone valves and providing on-demand control of each of the subzone valves, each pilot valve in the second irrigation zone comprising:
  - a pilot valve inlet in fluid communication with a corresponding subzone valve and configured to receive fluid from the corresponding subzone valve;
  - a pilot valve outlet in fluid communication with the corresponding subzone valve and configured to direct fluid downstream of the corresponding subzone valve;
  - a pilot valve seat intermediate the pilot valve inlet and the pilot valve outlet;
  - a pilot valve member biased away from the valve seat to an open position and biased against a closed position; and
  - a swellable material in operational engagement with the pilot valve member to move the pilot valve member relative to the pilot valve seat between the open position and the closed position;

wherein, when the swellable material is swollen in response to moisture to close the pilot valve, water flow from the pilot valve outlet to the corresponding subzone valve is shut off and closes the corresponding subzone valve;

wherein, when the swellable material is not swollen such that the pilot valve is in an open position, water flows from the pilot valve outlet to the corresponding subzone valve and opens the corresponding subzone valve.

* * * * *